US012626726B2

(12) United States Patent　　　　(10) Patent No.:　US 12,626,726 B2

Mizukami　　　　　　　　　　　　(45) Date of Patent:　May 12, 2026

(54) EDITING DEVICE, IMAGE PROCESSING DEVICE, TERMINAL DEVICE, EDITING METHOD, IMAGE PROCESSING METHOD, AND PROGRAM

(71) Applicant: FUJIFILM Corporation, Tokyo (JP)

(72) Inventor: Hiroyuki Mizukami, Saitama (JP)

(73) Assignee: FUJIFILM Corporation, Tokyo (JP)

( * ) Notice:　Subject to any disclaimer, the term of this patent is extended or adjusted under 35 U.S.C. 154(b) by 206 days.

(21) Appl. No.: 18/493,140

(22) Filed:　Oct. 24, 2023

(65) Prior Publication Data

US 2024/0144974 A1　　May 2, 2024

(30) Foreign Application Priority Data

Oct. 26, 2022　(JP) ................................. 2022-171798

(51) Int. Cl.
　　*G11B 27/031*　　　(2006.01)
　　*G06T 5/20*　　　　(2006.01)
(52) U.S. Cl.
　　CPC .............. *G11B 27/031* (2013.01); *G06T 5/20* (2013.01); *G06T 2207/10016* (2013.01)
(58) Field of Classification Search
　　CPC .................... G11B 27/031; G06T 5/20; G06T 2207/10016
　　See application file for complete search history.

(56) References Cited

U.S. PATENT DOCUMENTS

| 2002/0101521 A1* | 8/2002 | Laaksonen ......... H04N 1/32128 |
| | | 348/231.6 |
| 2016/0171357 A1* | 6/2016 | Kwon ...................... H04N 1/00 |
| | | 358/1.15 |
| 2020/0090388 A1* | 3/2020 | Kamoda .............. H04N 23/633 |
| 2021/0076033 A1* | 3/2021 | Hu ........................ H04N 19/176 |
| 2023/0379571 A1* | 11/2023 | Boyd .................. G06F 3/04842 |

FOREIGN PATENT DOCUMENTS

| JP | 2017-011461 A | | 1/2017 | |
| JP | 6260840 B2 | | 1/2018 | |
| JP | 2019086870 A | * | 6/2019 | ......... G06F 16/9554 |
| KR | 20190095588 A | * | 8/2019 | ....... G06K 19/06028 |

OTHER PUBLICATIONS

The extended European search report issued by the European Patent Office on Mar. 4, 2024, which corresponds to European Patent Application No. 23205423.9-1224 and is related to U.S. Appl. No. 18/493,140.

* cited by examiner

*Primary Examiner* — Gelek W Topgyal
(74) *Attorney, Agent, or Firm* — Studebaker Brackett PLLC

(57)　　　　　　ABSTRACT

An editing device includes a first processor. The first processor is configured to display a first image on a first screen and a first video, as a background image of the first image, on the first screen, and edit an inside of the first screen in response to a provided instruction in a state where the first image and the first video are displayed on the first screen.

23 Claims, 24 Drawing Sheets

FIG. 3

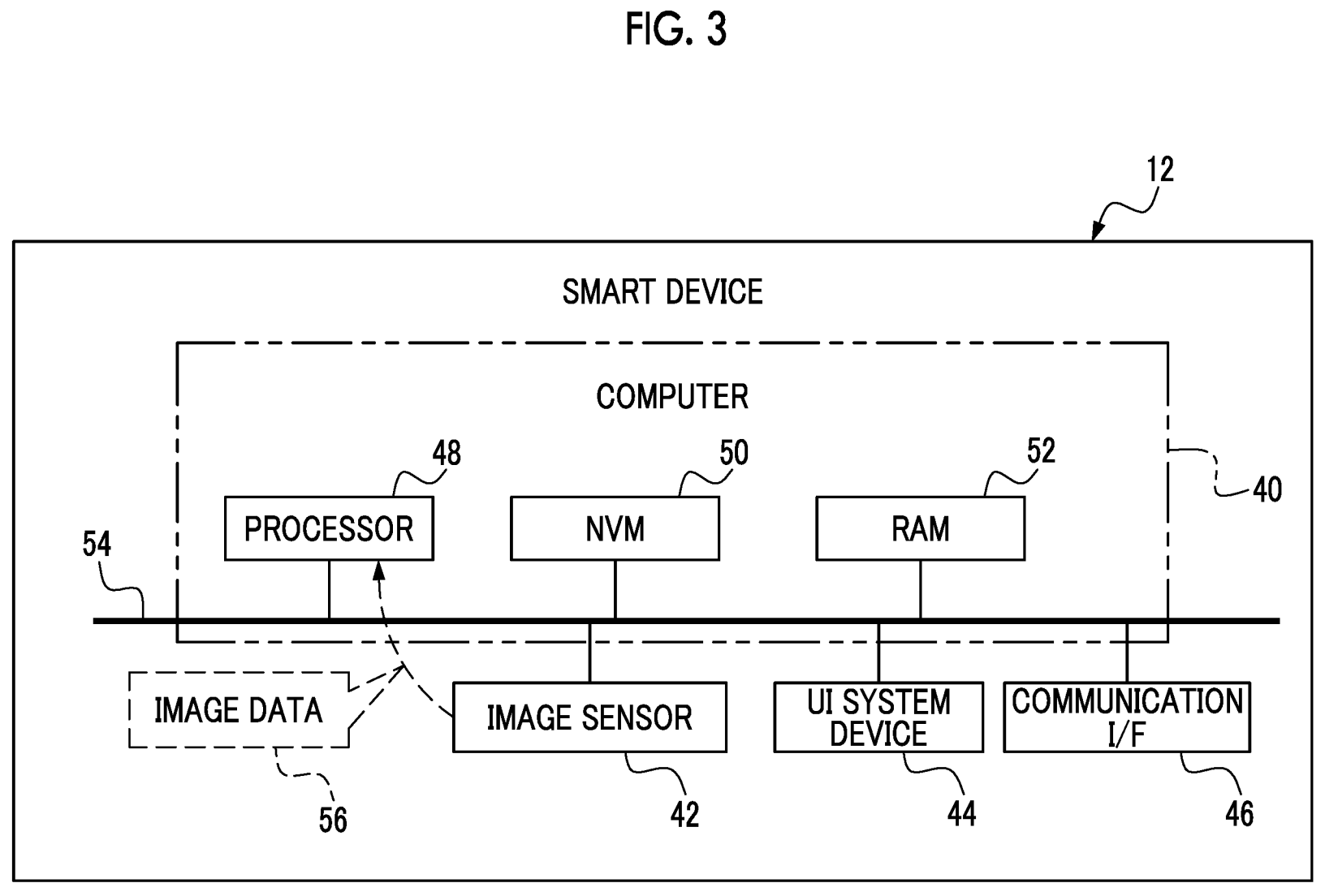

SMART DEVICE — 12

COMPUTER — 40

PROCESSOR — 48

NVM — 50

RAM — 52

IMAGE SENSOR — 42

UI SYSTEM DEVICE — 44

COMMUNICATION I/F — 46

IMAGE DATA — 56

Figure 14:
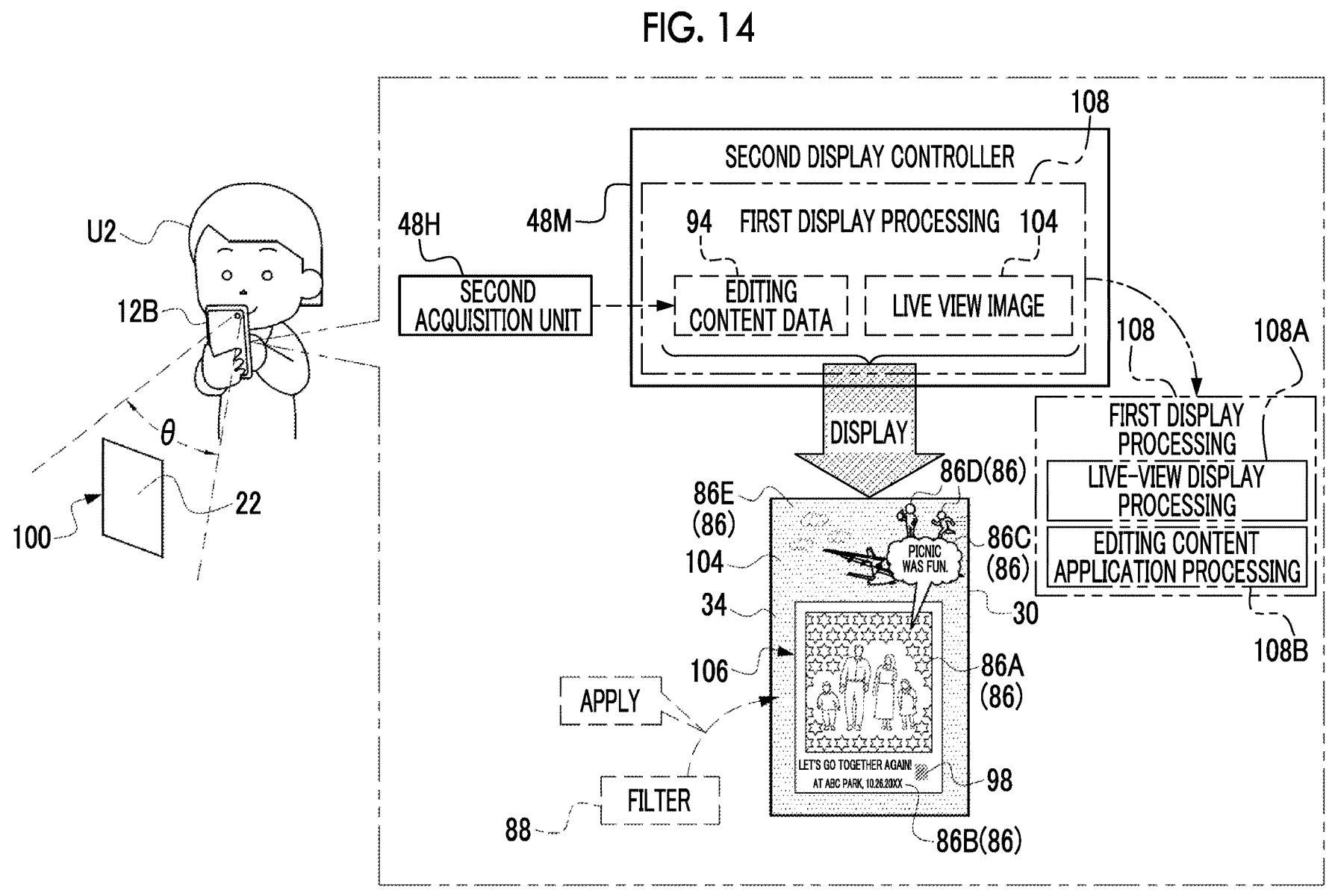

SECOND DISPLAY CONTROLLER    108

FIRST DISPLAY PROCESSING    104

LIVE VIEW IMAGE    94

EDITING CONTENT DATA

DISPLAY

SECOND ACQUISITION UNIT    48H

48M

108

FIRST DISPLAY PROCESSING    108A

LIVE-VIEW DISPLAY PROCESSING

EDITING CONTENT APPLICATION PROCESSING    108B

86D(86)

86C(86)

30

86A(86)

98

86B(86)

PICNIC WAS FUN.

LET'S GO TOGETHER AGAIN
AT ABC PARK, 10/26/20XX

86E(86)

104

34

106

APPLY

FILTER

Figure 23:
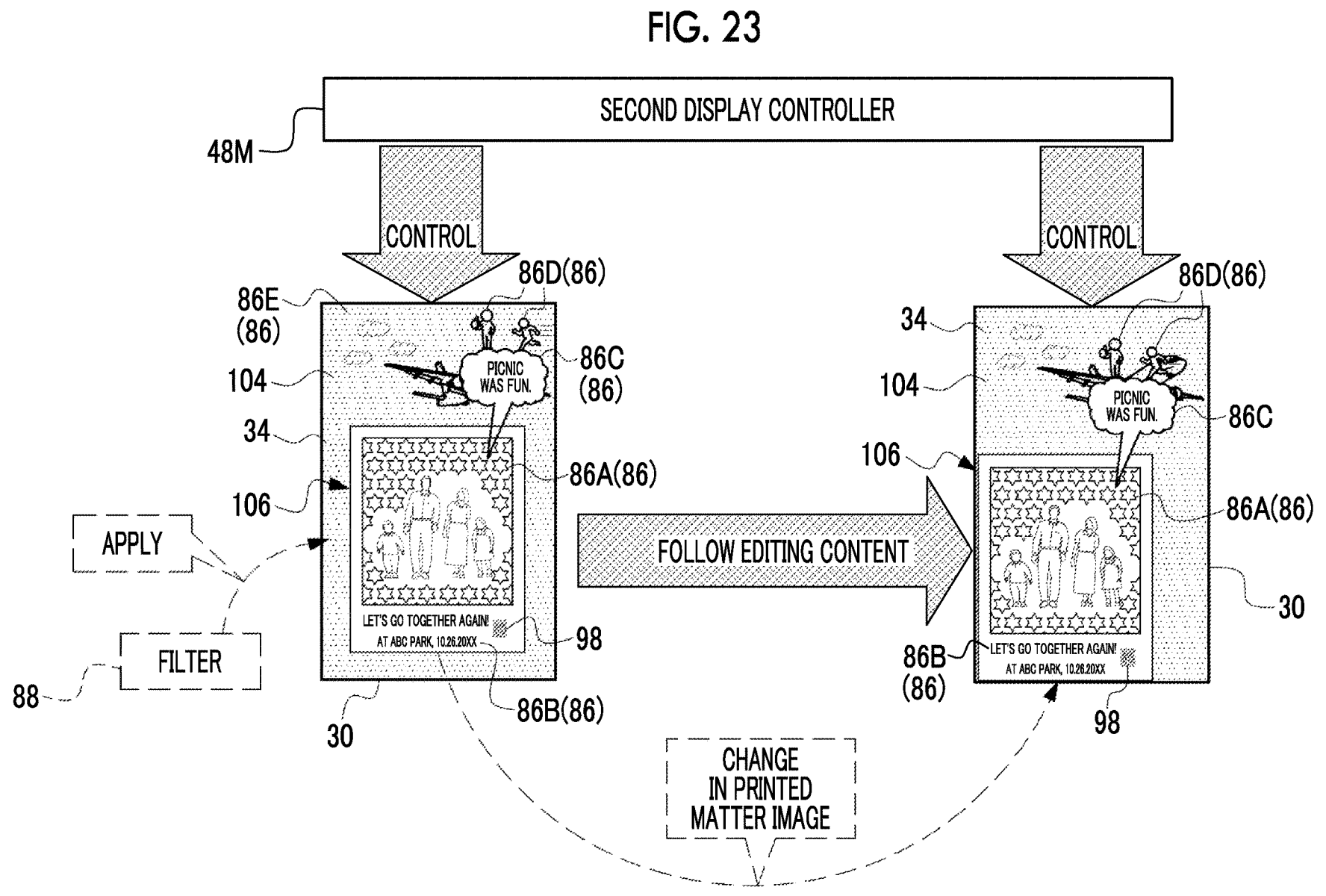

SECOND DISPLAY CONTROLLER

48M

CONTROL

CONTROL

FOLLOW EDITING CONTENT

CHANGE IN PRINTED MATTER IMAGE

PICNIC WAS FUN.

PICNIC WAS FUN.

LET'S GO TOGETHER AGAIN
AT ABC PARK. 10.26.20XX

LET'S GO TOGETHER AGAIN
AT ABC PARK. 10.26.20XX

86D(86)
86C
86A(86)
30
34
104
106
86B(86)
98

86E(86)
86D(86)
86C(86)
86A(86)
98
86B(86)
104
34
106
30

APPLY
FILTER
88

EDITING DEVICE, IMAGE PROCESSING DEVICE, TERMINAL DEVICE, EDITING METHOD, IMAGE PROCESSING METHOD, AND PROGRAM

CROSS-REFERENCE TO RELATED APPLICATIONS

This application claims priority under 35 USC 119 from Japanese Patent Application No. 2022-171798 filed on Oct. 26, 2022, the disclosure of which is incorporated by reference herein.

BACKGROUND

1. Technical Field

The technique of the present disclosure relates to an editing device, an image processing device, a terminal device, an editing method, an image processing method, and a program.

2. Related Art

JP6260840B discloses a content distribution service method using a printed matter. The content distribution service method described in JP6260840B includes first to ninth steps.

In the first step, a service app is started in a terminal A, and an image is selected. In the second step, a plurality of contents are edited on the image selected on an app screen. In the third step, the terminal A transmits editing information of the image and the content to a server side. In the fourth step, the server saves the editing information of the image and the content, and transmits saved information to a terminal A side. In the fifth step, the terminal A generates a predetermined recognition code in which the saved information is recorded and embeds the generated recognition code in the image. In the sixth step, the terminal A transmits the image in which the recognition code is embedded to a printing device side to print the image. In the seventh step, the service app is started in a terminal B, the recognition code is recognized in the printed matter distributed offline, and the saved information is detected. In the eighth step, the terminal B accesses the server based on the detected saved information, and then the editing information of the image and the content is transmitted from the server. In the ninth step, the image and the edited content are expressed or started by the editing information transmitted from the terminal B. Further, in the ninth step, the content is expressed or started in a superimposed manner on the image in a time series.

JP2017-011461A discloses an image providing system comprising an image composition device, a server, and a mobile terminal owned by a player.

In the image providing system described in JP2017-011461A, the image composition device captures a captured image including a still image and a video of the player by imaging means, displays the obtained still image on a display screen of display means, composites an edited image such as a character or a graphic that is input by input means with the still image by editing means to form a composite image, and prints the formed composite image on a sticker mount by printing means.

In the image providing system described in JP2017-011461A, the server uploads in a downloadable manner and saves the captured image and the composite image in association with specific information that specifies the captured image including the still image and the video and the composite image by the editing means.

In the image providing system described in JP2017-011461A, the mobile terminal has a function of transmitting, to the server, the specific information that specifies the desired captured image and composite image to download the captured image and the composite image.

In the image providing system described in JP2017-011461A, the image composition device comprises marker generation means and transmission means. The marker generation means generates an augmented reality marker composed of a graphic code of one-dimensional code or two-dimensional code representing display information that specifies an orientation, position, size, or the like of an image for compositing and displaying the captured image by the imaging means and the composite image by the editing means on a real image by an augmented reality technique and causes the printing means to print the generated marker on the sticker mount. The transmission means transmits, to the server, the captured image by the imaging means and the composite image by the editing means for saving.

In the image providing system described in JP2017-011461A, the mobile terminal comprises a camera, reading means, communication means, and composition means.

The reading means reads the augmented reality marker printed on the sticker mount. The communication means transmits, to the server, the specific information corresponding to the captured image and the composite image to be downloaded to specify the captured image and the composite image, and calls and receives the specified captured image and composite image from the server. The composition means composites, based on the display information represented by the augmented reality marker read by the reading means, at least one of the still image, video, or composite image of the player, which are captured images received by the communication means, with the image captured by the camera and displays the composite image on a screen of a monitor.

In the image providing system described in JP2017-011461A, the marker generation means causes the printing means to print the augmented reality marker on the sticker mount together with the composite image. Further, the marker generation means also displays the generated augmented reality marker on the display screen, and the reading means of the mobile terminal reads the augmented reality marker displayed on the display screen.

SUMMARY

In one embodiment according to the technique of the present disclosure, there are provided an editing device, an image processing device, a terminal device, an editing method, an image processing method, and a program capable of causing a user to edit, in a state where a first image displayed on a first screen and a first video displayed as a background image of the first image are visually comparable with each other, an inside of the first screen.

A first aspect according to the technique of the present disclosure is an editing device comprising a first processor, in which the first processor is configured to display a first image on a first screen and a first video, as a background image of the first image, on the first screen, and edit an inside of the first screen in response to a provided instruction in a state where the first image and the first video are displayed on the first screen.

A second aspect according to the technique of the present disclosure is the editing device according to the first aspect, in which the first processor is configured to display, on the first screen, an editing content obtained by editing the inside of the first screen.

A third aspect according to the technique of the present disclosure is the editing device according to the first aspect or the second aspect, in which the first video is a live view image.

A fourth aspect according to the technique of the present disclosure is the editing device according to any one of the first aspect to the third aspect, in which the first processor is configured to edit the inside of the first screen to change a visual impression of the first image.

A fifth aspect according to the technique of the present disclosure is the editing device according to any one of the first aspect to the fourth aspect, in which the first processor is configured to adjust image quality of the first video to edit the inside of the first screen.

A sixth aspect according to the technique of the present disclosure is the editing device according to the fifth aspect, in which the first processor is configured to perform processing on the first video using a filter to adjust the image quality.

A seventh aspect according to the technique of the present disclosure is the editing device according to any one of the first aspect to the sixth aspect, in which the first processor is configured to assign a virtual image to edit the inside of the first screen.

An eighth aspect according to the technique of the present disclosure is the editing device according to any one of the first aspect to the seventh aspect, in which the first processor is configured to save an editing content obtained by editing the inside of the first screen, acquire a second image that enables a save destination of the editing content to be specified, assign the acquired second image to the first image to generate a third image, and output the generated third image.

A ninth aspect according to the technique of the present disclosure is the editing device according to the eighth aspect, in which the first processor is configured to display a sample image in the first screen, and the sample image is an image that enables a portion where the second image is assigned to the first image to be specified, and is displayed at the portion.

A tenth aspect according to the technique of the present disclosure is an image processing device comprising a second processor, in which the second processor is configured to capture a printed matter obtained by printing the third image output from the editing device according to the eighth aspect or the ninth aspect to acquire a fourth image showing the printed matter, detect the second image from the fourth image, acquire the editing content from the save destination based on the second image, perform first display processing of displaying the fourth image and the editing content on a second screen, store history information in which the second image is associated with the editing content in a memory, acquire, in a case where the second image is detected from the fourth image in a state where the history information is stored in the memory, the editing content corresponding to the detected second image from the history information, and perform second display processing of displaying, on the second screen, the fourth image including the second image corresponding to the editing content acquired from the history information and the editing content acquired from the history information.

An eleventh aspect according to the technique of the present disclosure is the image processing device according to the tenth aspect, in which the storing of the history information and the acquisition of the editing content from the history information are realized offline.

A twelfth aspect according to the technique of the present disclosure is the image processing device according to the tenth aspect or the eleventh aspect, in which the editing device adjusts, in a state where the first video is displayed on the first screen as the background image of the first image, image quality of the first video to edit the inside of the first screen, and the second display processing includes first processing of displaying a second video including the fourth image on the second screen, and second processing of applying the image quality adjusted by the editing device to a background image of the fourth image in the second video.

A thirteenth aspect according to the technique of the present disclosure is the image processing device according to the twelfth aspect, in which the second video is a live view image.

A fourteenth aspect according to the technique of the present disclosure is the image processing device according to the twelfth aspect or the thirteenth aspect, in which the adjustment of the image quality is realized by using a first filter, and the second processing is realized by applying a second filter corresponding to the first filter to the background image of the fourth image in the second video.

A fifteenth aspect according to the technique of the present disclosure is the image processing device according to the fourteenth aspect, in which the second processor is configured to cause an application position and application size of the second filter to follow a display position and/or display size of the background image of the fourth image in the second video.

A sixteenth aspect according to the technique of the present disclosure is the image processing device according to any one of the tenth aspect to the fifteenth aspect, in which the second processor is configured to display the fourth image on the second screen in a live view mode, and display, in the second screen, the editing content to follow the fourth image.

A seventeenth aspect according to the technique of the present disclosure is the image processing device according to the sixteenth aspect, in which the second processor is configured to cause a display position and/or display size of the editing content in the second screen to follow a change in a display position and/or display size of the fourth image in the second screen.

An eighteenth aspect according to the technique of the present disclosure is the image processing device according to any one of the tenth aspect to the seventeenth aspect, in which the second processor is configured to acquire an image obtained by reflecting the editing content on the fourth image as a still image for recording or a video for recording.

A nineteenth aspect according to the technique of the present disclosure is the image processing device according to any one of the tenth aspect to eighteenth aspect, in which the first display processing and/or the second display processing are realized by executing an application, and the second processor is configured to perform, in a case where the application is not introduced, introduction processing of introducing the application or auxiliary processing of assisting the introduction of the application.

A twentieth aspect according to the technique of the present disclosure is an image processing device comprising a second processor, in which the second processor is configured to capture a printed matter obtained by printing the third image output from the editing device according to the eighth aspect or the ninth aspect to acquire a fourth image showing the printed matter, detect the second image from the fourth image, acquire the editing content from the save destination based on the second image, and perform third display processing of displaying the fourth image and the editing content on a second screen, the editing device adjusts image quality of the first video in a state where the first video is displayed on the first screen as the background image of the first image to edit the inside of the first screen, and the third display processing includes third processing of displaying a second video including the fourth image on the second screen, and fourth processing of applying the image quality adjusted by the editing device to a background image of the fourth image in the second video.

A twenty-first aspect according to the technique of the present disclosure is the image processing device according to the twentieth aspect, in which the second video is a live view image.

A twenty-second aspect according to the technique of the present disclosure is the image processing device according to the twenty-first aspect, in which the adjustment of the image quality is realized by using a first filter, and the fourth processing is realized by applying a second filter corresponding to the first filter to the background image of the fourth image in the second video.

A twenty-third aspect according to the technique of the present disclosure is the image processing device according to the twenty-second aspect, in which the second processor is configured to cause an application position and application size of the second filter to follow a display position and/or display size of the background image of the fourth image in the second video.

A twenty-fourth aspect according to the technique of the present disclosure is the image processing device according to any one of the twentieth aspect to the twenty-third aspect, in which the second processor is configured to cause, in the second screen, the editing content to follow the fourth image.

A twenty-fifth aspect according to the technique of the present disclosure is the image processing device according to the twenty-fourth aspect, in which the second processor is configured to cause a display position and/or display size of the editing content in the second screen to follow a change in a display position and/or display size of the fourth image in the second screen.

A twenty-sixth aspect according to the technique of the present disclosure is the image processing device according to any one of the twentieth aspect to the twenty-fifth aspect, in which the second processor is configured to acquire an image obtained by reflecting the editing content on the fourth image as a still image for recording or a video for recording.

A twenty-seventh aspect according to the technique of the present disclosure is the image processing device according to any one of the twentieth aspect to the twenty-sixth aspect, in which the third display processing is realized by executing an application, and the second processor is configured to perform, in a case where the application is not introduced, introduction processing of introducing the application or auxiliary processing of assisting the introduction of the application.

A twenty-eighth aspect according to the technique of the present disclosure is a terminal device comprising the editing device according to any one of the first aspect to the ninth aspect, and a first communication interface that controls communication between the editing device and an external device.

A twenty-ninth aspect according to the technique of the present disclosure is a terminal device comprising the image processing device according to any one of the tenth aspect to the twenty-seventh aspect, and a second communication interface that controls communication between the image processing device and an external device.

A thirtieth aspect according to the technique of the present disclosure is an editing method comprising displaying a first image on a first screen and a first video, as a background image of the first image, on the first screen, and editing an inside of the first screen in response to a provided instruction in a state where the first image and the first video are displayed on the first screen.

A thirty-first aspect according to the technique of the present disclosure is an image processing method comprising capturing a printed matter obtained by printing the third image output from the editing device according to the eighth aspect or the ninth aspect to acquire a fourth image showing the printed matter, detecting the second image from the fourth image, acquiring the editing content from the save destination based on the second image, performing first display processing of displaying the fourth image and the editing content on a second screen, holding history information in which the second image is associated with the editing content, acquiring, in a case where the second image is detected from the fourth image in a state where the history information is held, the editing content corresponding to the detected second image from the history information, and performing second display processing of displaying, on the second screen, the fourth image including the second image corresponding to the editing content acquired from the history information and the editing content acquired from the history information.

A thirty-second aspect according to the technique of the present disclosure is an image processing method comprising capturing a printed matter obtained by printing the third image output from the editing device according to the eighth aspect or the ninth aspect to acquire a fourth image showing the printed matter, detecting the second image from the fourth image, acquiring the editing content from the save destination based on the second image, and performing third display processing of displaying the fourth image and the editing content on a second screen, in which the editing device adjusts, in a state where the first video is displayed on the first screen as the background image of the first image, image quality of the first video to edit the inside of the first screen, and the third display processing includes third processing of displaying a second video including the fourth image on the second screen, and fourth processing of applying the image quality adjusted by the editing device to a background image of the fourth image in the second video.

A thirty-third aspect according to the technique of the present disclosure is a program that causes a computer to execute editing processing including displaying a first image on a first screen and a first video, as a background image of the first image, on the first screen, and editing an inside of the first screen in response to a provided instruction in a state where the first image and the first video are displayed on the first screen.

A thirty-fourth aspect according to the technique of the present disclosure is a program that causes a computer to execute image processing including capturing a printed matter obtained by printing the third image output from the editing device according to the eighth aspect or the ninth aspect to acquire a fourth image showing the printed matter, detecting the second image from the fourth image, acquiring the editing content from the save destination based on the second image, performing first display processing of displaying the fourth image and the editing content on a second screen, holding history information in which the second image is associated with the editing content, acquiring, in a case where the second image is detected from the fourth image in a state where the history information is held, the editing content corresponding to the detected second image from the history information, and performing second display processing of displaying, on the second screen, the fourth image including the second image corresponding to the editing content acquired from the history information and the editing content acquired from the history information.

A thirty-fifth aspect according to the technique of the present disclosure is a program that causes a computer to execute image processing, in which the image processing includes capturing a printed matter obtained by printing the third image output from the editing device according to the eighth aspect or the ninth aspect to acquire a fourth image showing the printed matter, detecting the second image from the fourth image, acquiring the editing content from the save destination based on the second image, and performing third display processing of displaying the fourth image and the editing content on a second screen, the editing device adjusts, in a state where the first video is displayed on the first screen as the background image of the first image, image quality of the first video to edit the inside of the first screen, and the third display processing includes third processing of displaying a second video including the fourth image on the second screen, and fourth processing of applying the image quality adjusted by the editing device to a background image of the fourth image in the second video.

BRIEF DESCRIPTION OF THE DRAWINGS

Exemplary embodiments of the technology of the disclosure will be described in detail based on the following figures, wherein:

FIG. 3 is a block diagram showing an example of a hardware configuration of an electric system of the smart device;

FIG. 5 is a conceptual diagram showing an example of a content of processing of a first display controller;

FIG. 6 is a conceptual diagram showing an example of an aspect in which a plurality of print target images are displayed in a list on a screen;

FIG. 10 is a conceptual diagram showing an example of an aspect in which a printed matter image with a matrix type two-dimensional code is printed on an instant film and thus a printed matter is generated and discharged;

FIG. 11 is a conceptual diagram showing an example of an aspect in which a live view image obtained by capturing a subject including the printed matter is displayed on the screen;

FIG. 14 is a conceptual diagram showing an example of a display aspect in the screen in a case where an editing content is applied to the live view image including the printed matter image;

FIG. 17 is a conceptual diagram showing an example of the display aspect in the screen in a case where the editing content indicated by the editing content data acquired from the history information is applied to the live view image including the printed matter image;

FIG. 23 is a conceptual diagram showing an example of an aspect in which the editing content follows according to a change in the printed matter image in the screen.

DETAILED DESCRIPTION

Hereinafter, an example of an embodiment of an editing device, an image processing device, a terminal device, an editing method, an image processing method, and a program according to the technique of the present disclosure will be described with reference to accompanying drawings.

Figure 1:
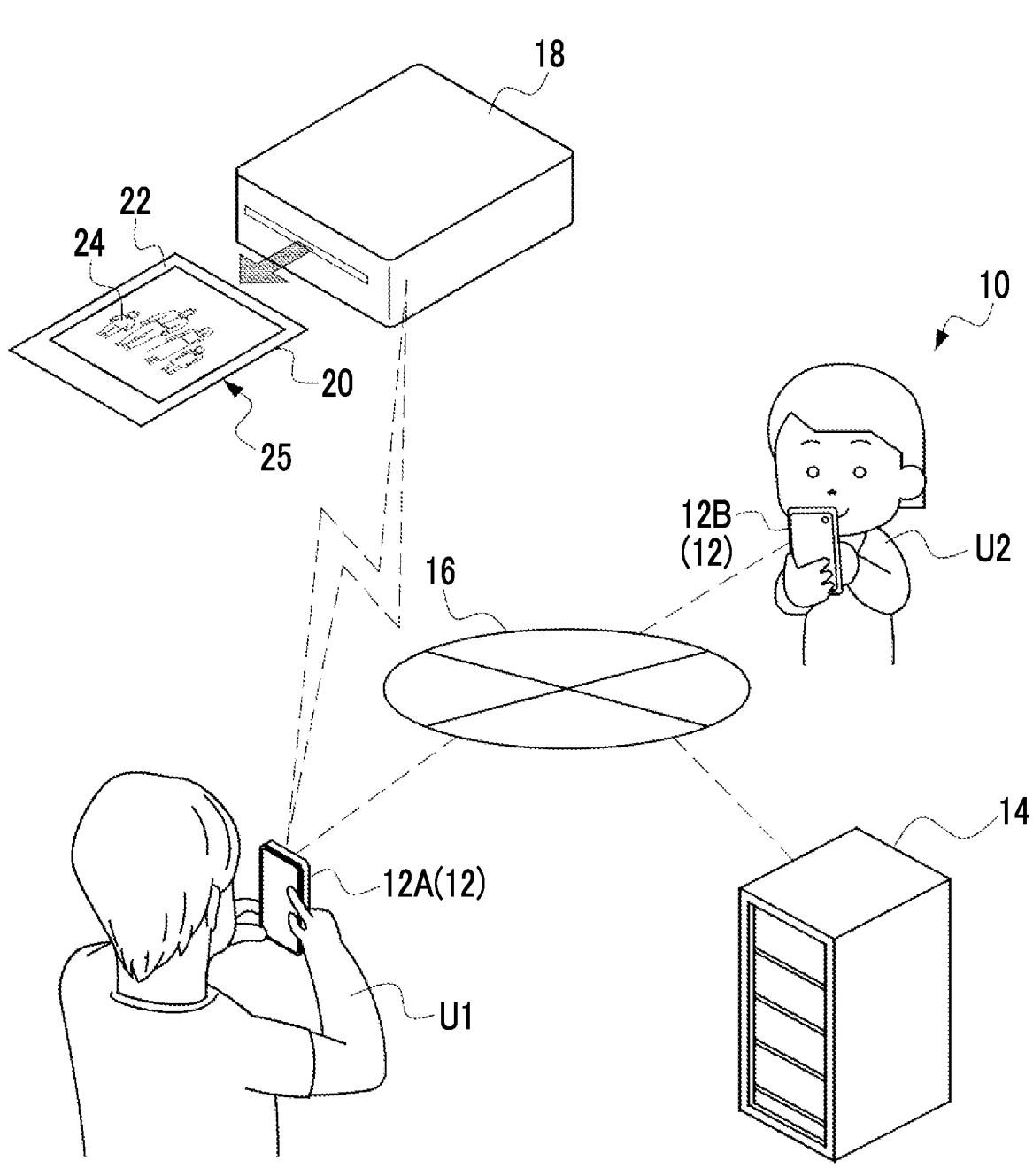
FIG. 1 is a conceptual diagram showing an example of an overall configuration of an image processing system.

As shown in FIG. 1 as an example, an image processing system 10 comprises a plurality of smart devices 12 and a server 14. The smart device 12 is an example of a "terminal device" according to the technique of the present disclosure. The server 14 is an example of an "external device" according to the technique of the present disclosure.

In the example shown in FIG. 1, a smartphone is shown as the smart device 12. The smartphone is merely an example and may be a smart watch, a tablet terminal, a personal computer, or the like. Further, in the example shown in FIG. 1, smart devices 12A and 12B are shown as the plurality of smart devices 12. The smart device 12A is used by a user U1 and the smart device 12B is used by a user U2. In the following, for convenience of description, in a case where there is no need to distinguish between the smart device 12A and the smart device 12B, the smart devices will be referred to as "smart device 12". Further, in the following, for convenience of description, in a case where there is no need to distinguish between the user U1 and the user U2, the users will be referred to as "user" without reference numerals.

The plurality of smart devices 12 and the server 14 are communicably connected to each other via a network 16. An example of the network 16 includes a wide area network (WAN) or a local area network (LAN).

The server 14 provides the smart device 12 with a service in response to a request from the smart device 12. That is, the server 14 executes processing in response to the request from the smart device 12 and provides a result of the executed processing to the smart device 12 of a request source.

The smart device 12A is communicably connected to a printing device 18. An example of the printing device 18 includes an instant printer that prints on an instant film 20. Here, an instant printer is illustrated, but this is merely an example. Any device having a communication function and a printing function, such as a multifunction device capable of communicating with a terminal device such as the smart device 12, may be employed. Further, the instant film 20 is also merely an example. Another type of film, printing paper, or the like may be employed, or any medium on which the image can be printed (in other words, medium on which the image can be recorded) may be employed. In the present embodiment, development is also included in the concept of printing.

In the example shown in FIG. 1, the printing device 18 prints an image 24 (for example, image transmitted from the smart device 12A) on a surface 22 of the instant film 20 in response to an instruction provided from the smart device 12A to generate a printed matter 25 (business card-sized instant photograph in the example shown in FIG. 1). The printing device 18 discharges the generated printed matter 25 to the outside of the printing device 18.

Figure 2:
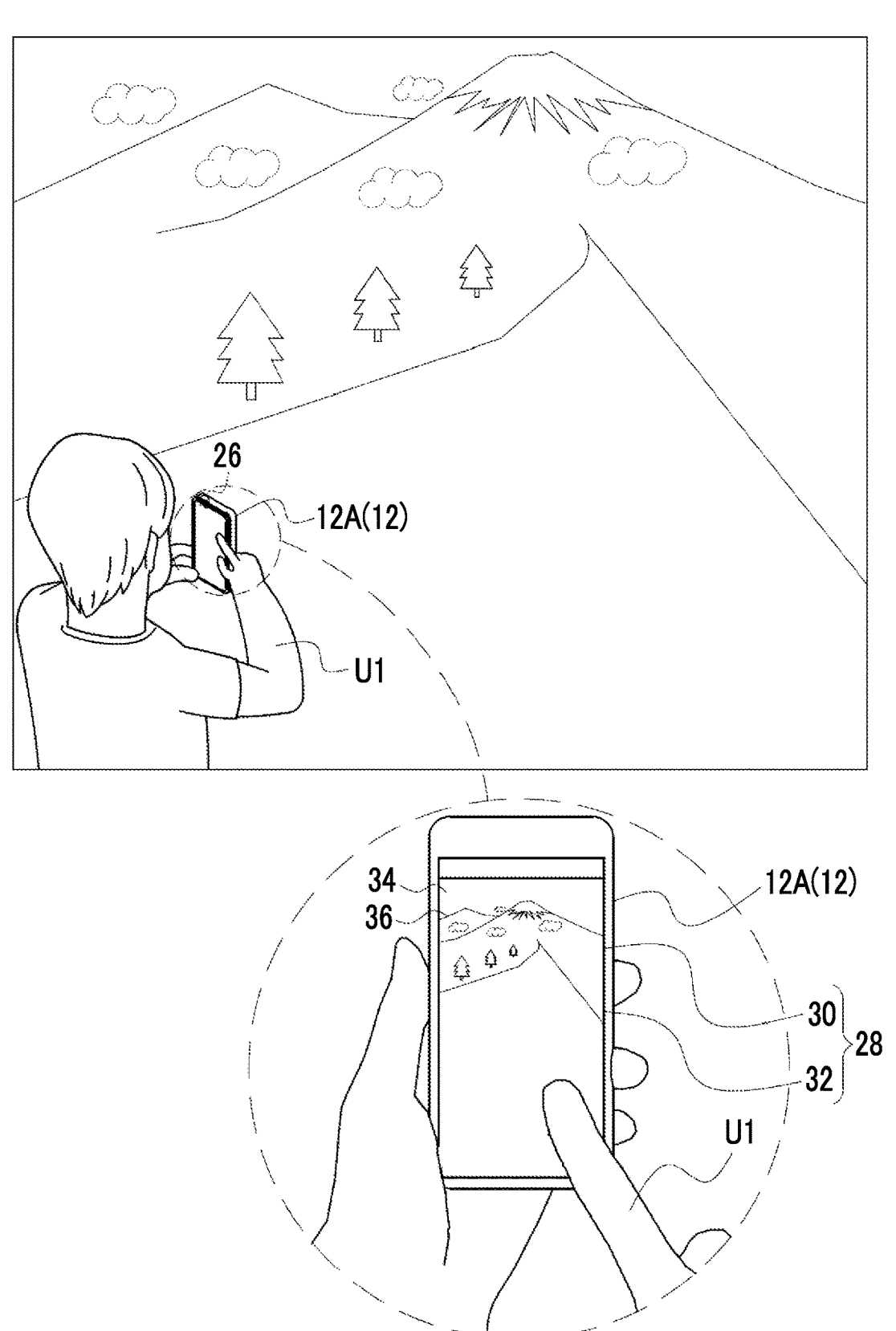
FIG. 2 is a conceptual diagram showing an example of an aspect in which a user uses a smart device.

As shown in FIG. 2 as an example, the smart device 12 comprises an imaging apparatus 26, and the imaging apparatus 26 captures a subject in response to an instruction provided by the user U1.

The smart device 12 comprises a touch panel display 28. The touch panel display 28 has a display 30 (for example, a liquid crystal display or an electroluminescent display) and a touch panel 32, and is formed by, for example, superimposing the touch panel 32 on a screen 34 of the display 30.

The imaging apparatus 26 captures the subject in response to the instruction from the user U1 to generate an image for recording (for example, still image for recording and/or video for recording) or a live view image 36. The image for recording is stored in a memory (for example, NVM 50 shown in FIG. 3 or memory card). The live view image 36 is displayed on the screen 34. The live view image 36 is a video for display, is generated at a specific frame rate (for example, tens to hundreds of frames/sec), and is displayed on the screen 34.

As shown in FIG. 3 as an example, the smart device 12 comprises a computer 40, an image sensor 42, a user interface (UI) system device 44, and a communication I/F (interface) 46. The computer 40 is an example of an "editing device", an "image processing device", and a "computer" according to the technique of the present disclosure. The communication I/F 46 is an example of a "first communication interface" and a "second communication interface" according to the technique of the present disclosure.

The computer 40 comprises a processor 48, the non-volatile memory (NVM) 50, and a random access memory (RAM) 52. The processor 48, the NVM 50, and the RAM 52 are connected to a bus 54. The processor 48 is an example of a "first processor" and a "second processor" according to the technique of the present disclosure. The NVM 50 is an example of a "memory" according to the technique of the present disclosure.

The processor 48 is a processing device including a digital signal processor (DSP), a central processing unit (CPU), and a graphics processing unit (GPU), and the DSP and the GPU operate under the control of the CPU to execute processing related to the image. Here, an example of the processor 48 includes the processing device including the DSP, the CPU, and the GPU, but this is merely an example. The processor 48 may be one or more CPUs and one or more GPUs, may be one or more CPUs and a DSP with integrated GPU functions, may be one or more CPUs and a DSP without integrated GPU functions, or may be equipped with a tensor processing unit (TPU).

The NVM 50 is a non-volatile storage device that stores various programs, various parameters, and the like. An example of the NVM 50 includes a flash memory (for example, electrically erasable and programmable read only memory (EEPROM)). The RAM 52 is a memory where information is temporarily stored, and is used as a work memory by the processor 48. An example of the RAM 52 includes a dynamic random access memory (DRAM) or a static random access memory (SRAM).

The image sensor 42 is connected to the bus 54. An example of the image sensor 42 includes a complementary metal oxide semiconductor (CMOS) image sensor. The image sensor 42 captures the subject under the control of the processor 48 to generate image data 56.

Here, an example of the image sensor 42 includes the CMOS image sensor, but this is merely an example. The image sensor 42 may be another type of image sensor such as a charge coupled device (CCD) image sensor.

The UI system device 44 is connected to the bus 54. The UI system device 44 includes the touch panel display 28 (refer to FIG. 2), one or more hard keys (not shown), a microphone (not shown), a speaker (not shown), and the like. The UI system device 44 receives the instruction from the user and outputs a signal indicating the received instruction to the processor 48. Further, the UI system device 44 presents various types of information to the user under the control of the processor 48. The presentation of the various types of information is realized, for example, by displaying the various types of information on the display 30 (refer to FIG. 2) or by outputting the various types of information as voice from the speaker.

The communication I/F 46 is an interface including a communication processor, an antenna, and the like, and is connected to the bus 54. The communication I/F 46 controls communication between the computer 40 and the server 14 and the like. A communication standard applied to the communication I/F 46 may be, for example, a wireless communication standard including 5th generation mobile communication system (5G), Wi-Fi (registered trademark), Bluetooth (registered trademark), or the like, or may be a wired communication standard including Ethernet (registered trademark), Fast Ethernet (registered trademark), Gigabit Ethernet (registered trademark), or the like.

By the way, as a known service in the related art, a service is known in which a first printed matter image, which is a digital image that virtually expresses an overall aspect of the printed matter, is displayed on a screen of a first smart device before an image is printed on an instant film and a first user edits the first printed matter image. For example, an editing content of the first printed matter image by the first user is saved in a server or the like, and the printed matter to which the editing content is not reflected is provided to a second user. The printed matter is captured by a second smart device and is incorporated into the second smart device as a second printed matter image. The second smart device acquires the editing content from the server or the like in response to an instruction from the second user, reflects the editing content on the second printed matter image, and displays the editing content on the screen. Accordingly, the second user can view the second printed matter image on which the editing content is reflected.

In the present embodiment, the image processing system 10 provides the user with a service that is a further development of the known service in the related art described above. In the image processing system 10, a live view image obtained by capturing the subject including the printed matter 25 is displayed on the screen 34 of the smart device 12B, and the editing content by the user U1 is reflected on an inside of the screen 34 on which the live view image is displayed. However, at an editing stage, it is difficult for the user U1 to specifically imagine a degree of visual effect on the user U2 of the editing content reflected on the inside of the screen 34 of the smart device 12B (that is, what kind of impression does the user U2 have on the editing content).

Figure 4:
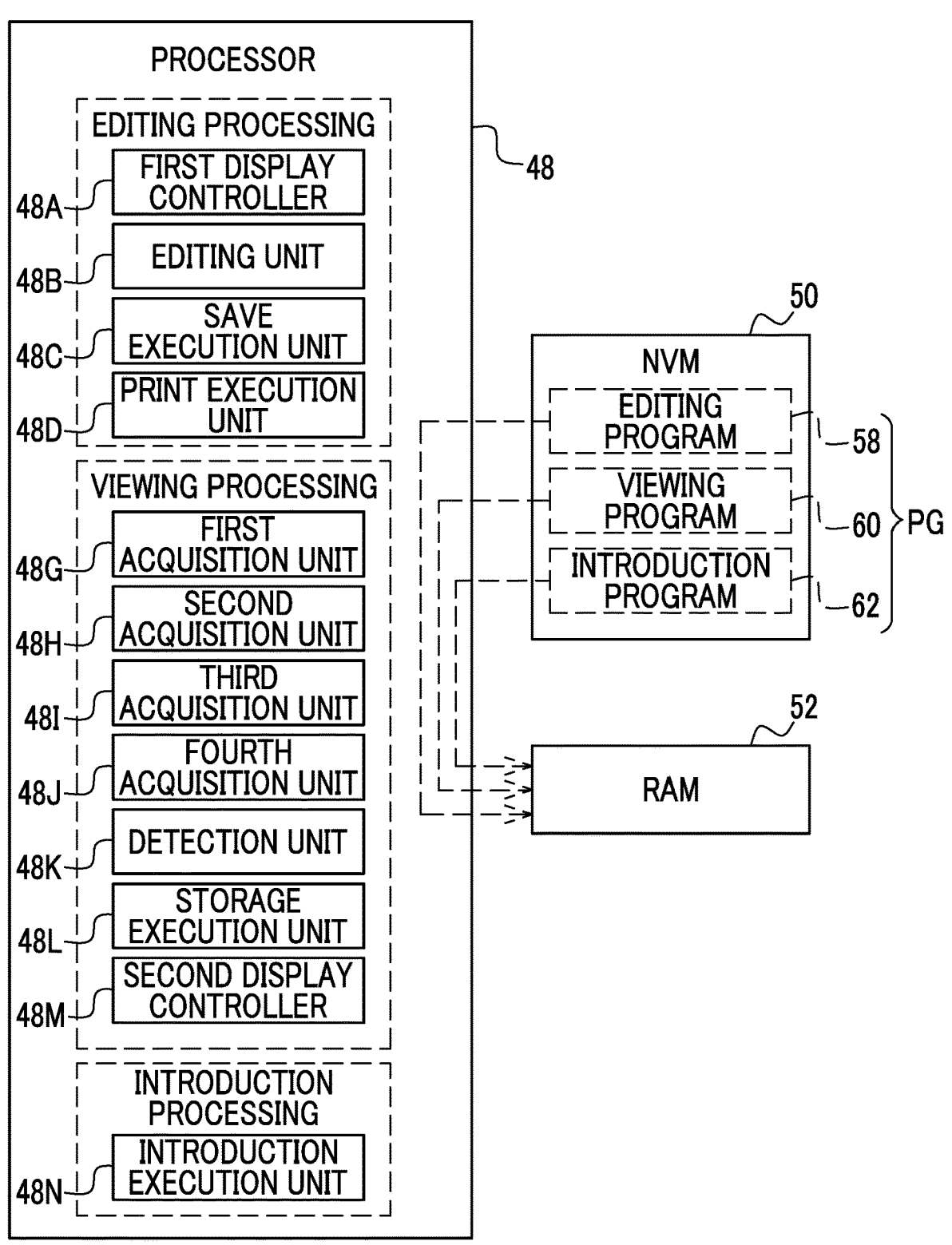
FIG. 4 is a block diagram showing an example of a main part function of the smart device.

In view of these circumstances, in the present embodiment, as shown in FIG. 4 as an example, the processor 48 performs editing processing, viewing processing, and introduction processing. The processor 48 executes a program PG to realize the editing processing, the viewing processing, and the introduction processing. In the following, for convenience of description, in a case where there is no need to distinguish between the editing processing, the viewing processing, and the introduction processing, the pieces of processing will be referred to as "content providing processing".

The program PG is stored in the NVM 50. The program PG is an example of a "program" according to the technique of the present disclosure. The program PG includes an editing program 58, a viewing program 60, and an introduction program 62.

The processor 48 reads out the editing program 58 from the NVM 50 and executes the readout editing program 58 on the RAM 52 to perform the editing processing. The editing processing performed by the processor 48 is an example of "editing processing" according to the technique of the present disclosure. The processor 48 operates as a first display controller 48A, an editing unit 48B, a save execution unit 48C, and a print execution unit 48D, according to the editing program 58 executed on the RAM 52, to realize the editing processing.

The processor 48 reads out the viewing program 60 from the NVM 50 and executes the readout viewing program 60 on the RAM 52 to perform the viewing processing. The viewing program 60 is an example of an "application" according to the technique of the present disclosure. The viewing processing performed by the processor 48 is an example of "image processing" according to the technique of the present disclosure. The processor 48 operates as a first acquisition unit 48G, a second acquisition unit 48H, a third acquisition unit 48I, a fourth acquisition unit 48J, a detection unit 48K, a storage execution unit 48L, and a second display controller 48M, according to the viewing program 60 executed on the RAM 52, to realize the viewing processing.

The processor 48 reads out the introduction program 62 from the NVM 50 and executes the readout introduction program 62 on the RAM 52 to perform the introduction processing. The processor 48 operates as an introduction execution unit 48N, according to the introduction program 62 executed on the RAM 52, to realize the introduction processing.

Next, an example of a processing content performed by the smart device 12A used by the user U1 will be described with reference to FIGS. 5 to 10.

Figure 5:
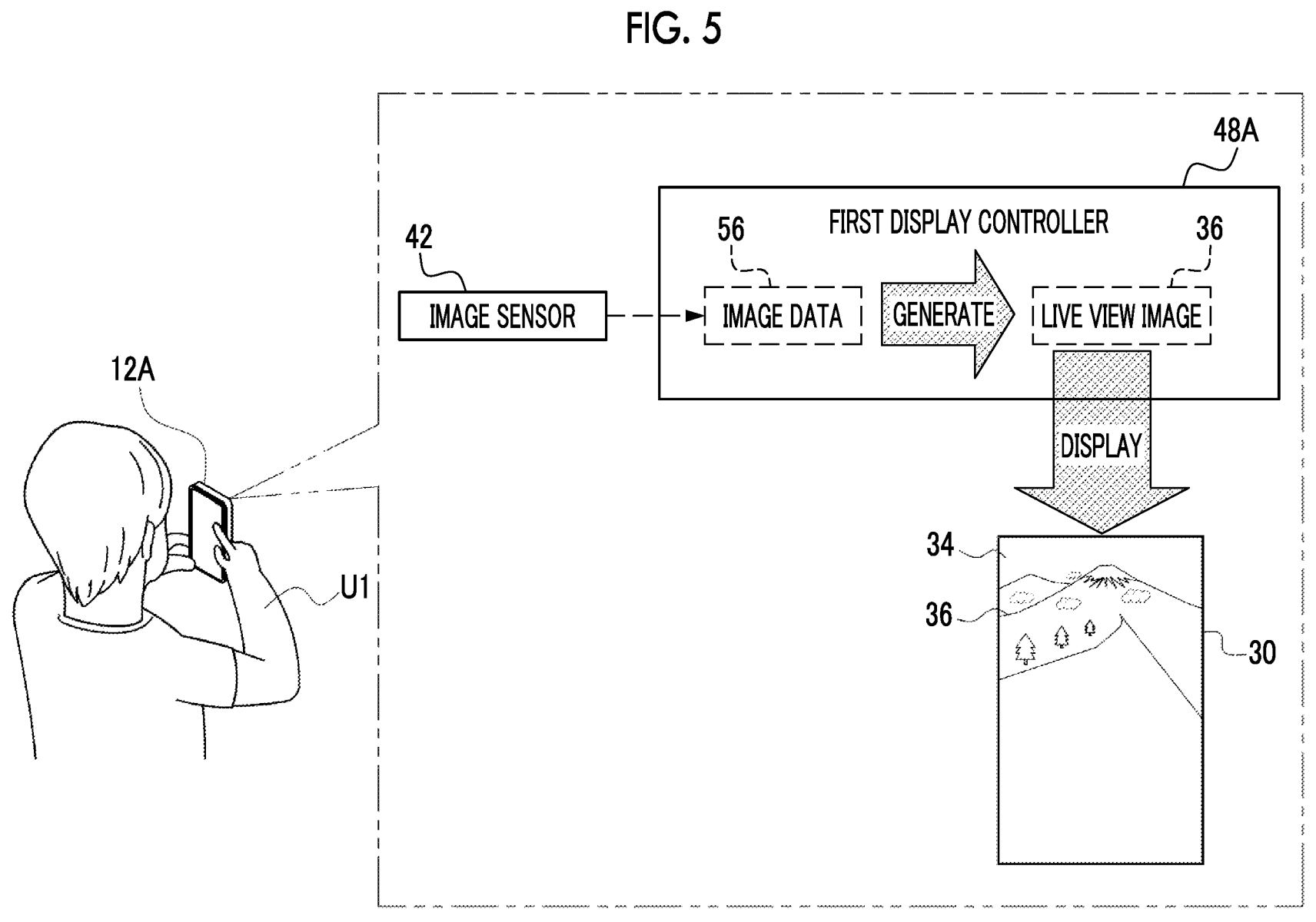

As shown in FIG. 5 as an example, the first display controller 48A acquires the image data 56 from the image sensor 42 and generates the live view image 36 based on the acquired image data 56. The first display controller 48A displays the live view image 36 on the screen 34 according to the specific frame rate.

Figure 6:
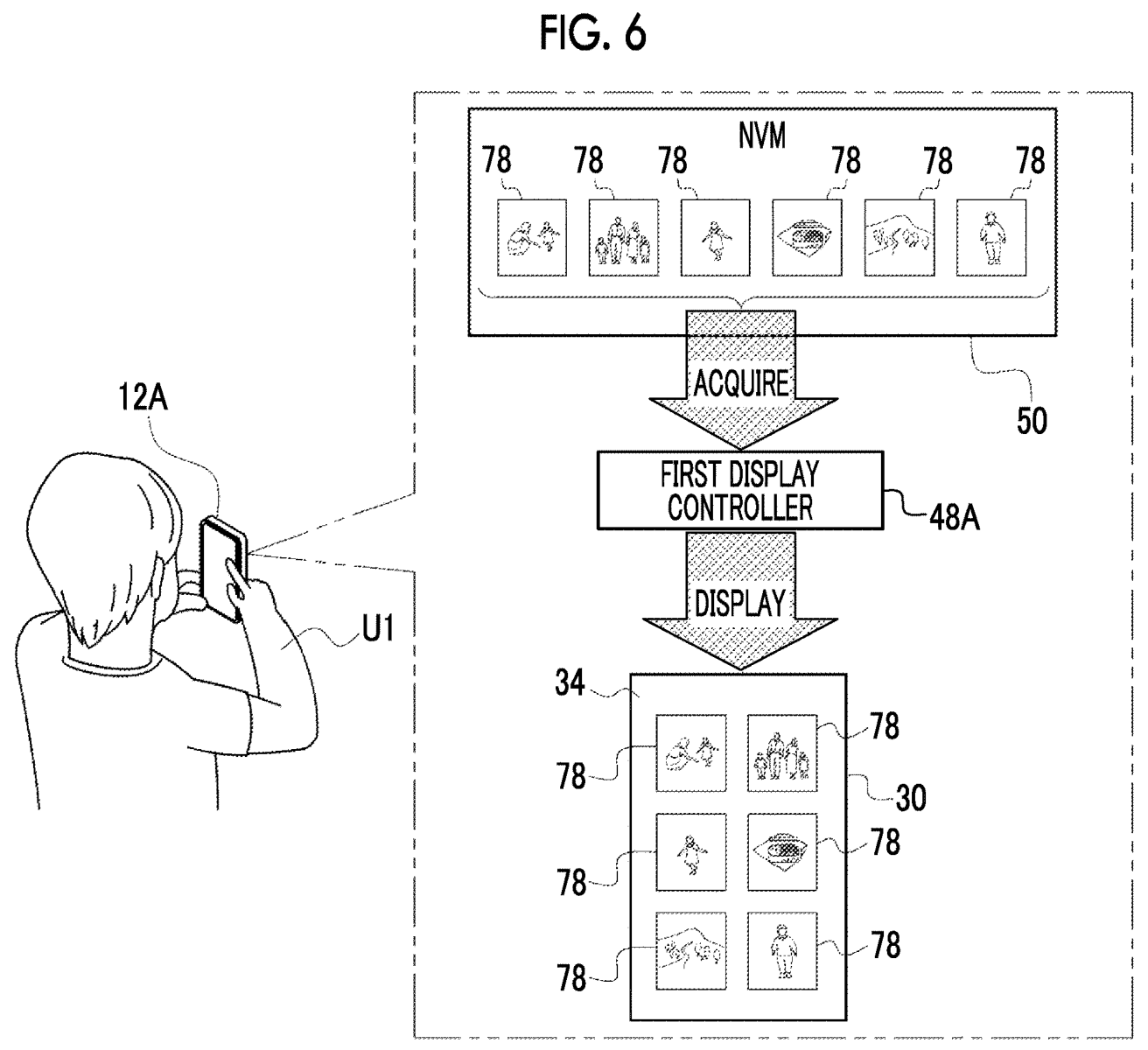

As shown in FIG. 6 as an example, a plurality of print target images 78 are stored in the NVM 50. The print target image 78 is an image to be printed on the instant film 20. The first display controller 48A acquires the plurality of print target images 78 from the NVM 50 according to the instruction provided by the user U1 and displays the acquired plurality of print target images 78 on the screen 34. For example, the plurality of print target images 78 are displayed in a list on the screen 34.

Figure 7:
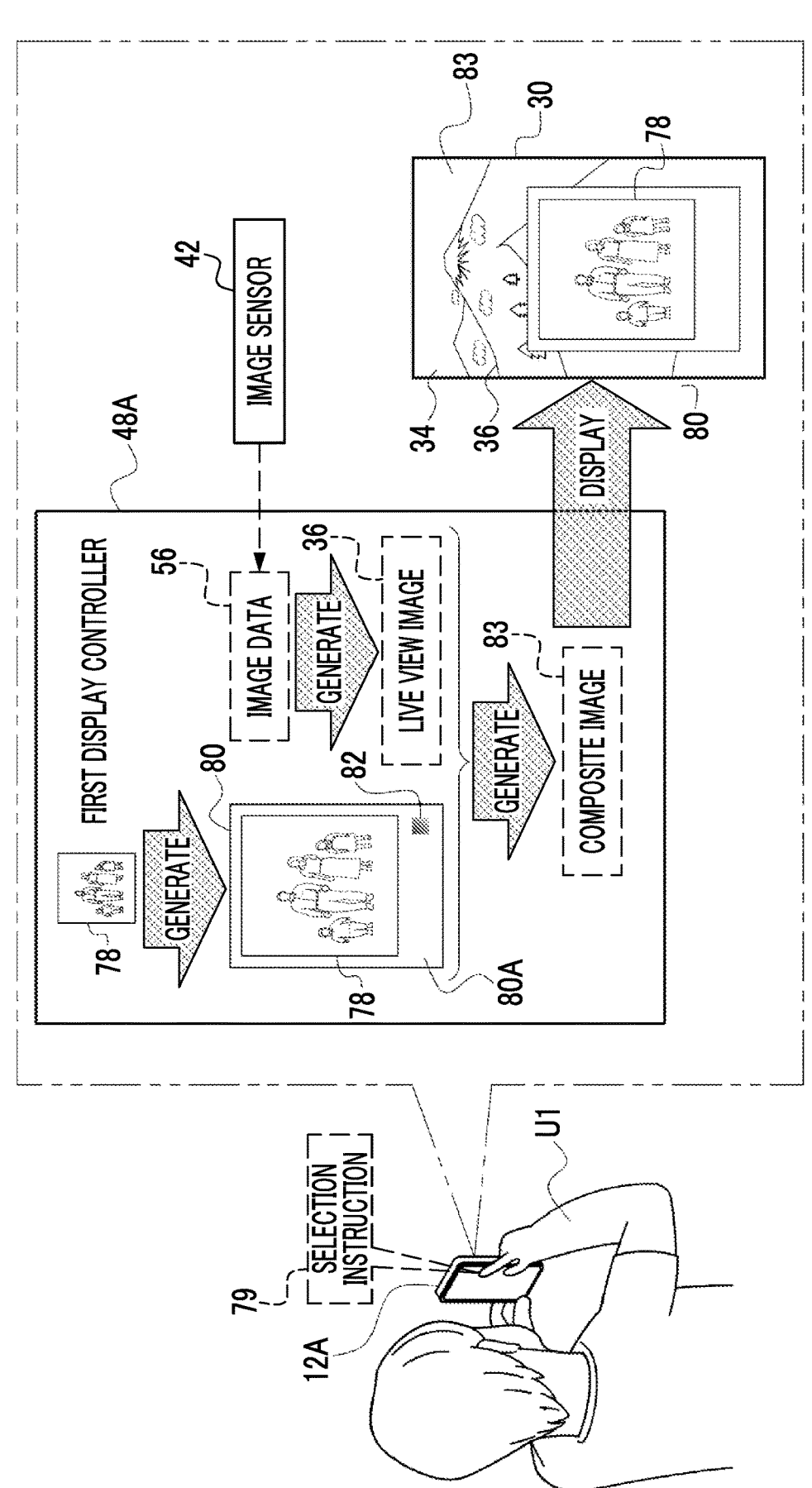
FIG. 7 is a conceptual diagram showing an example of an aspect in which a composite image generated based on a printed matter image obtained based on a selected print target image and a live view image is displayed on the screen.

In a case where the plurality of print target images 78 are displayed on the screen 34, one of the plurality of print target images 78 displayed on the screen 34 is selected by the user U1. For example, as shown in FIG. 7, the smart device 12A is provided with a selection instruction 79, which is an instruction to select one of the plurality of print target images 78 displayed on the screen 34, from the user U1. The first display controller 48A selects one print target image 78 according to the selection instruction 79 provided by the user U1 and generates a printed matter image 80 based on the selected print target image 78. The printed matter image 80 is a digital image that virtually expresses an overall aspect of a printed matter in which the print target image 78 is printed on the surface 22 of the instant film 20.

The printed matter image 80 includes the print target image 78 and a sample image 82. In the printed matter image 80, a margin region 80A is provided around the print target image 78, and the first display controller 48A assigns the sample image 82 in the margin region 80A (lower right part in front view in the example shown in FIG. 7). The sample image 82 is an example of a "sample image" according to the technique of the present disclosure.

The sample image 82 is a sample (that is, template matrix type two-dimensional code) of a matrix type two-dimensional code 98 (refer to FIG. 10) and is assigned to a position corresponding to a position of the matrix type two-dimensional code 98 to be printed on an actual instant film 20 in the printed matter image 80. The sample image 82 is used as an image that enables a portion where the matrix type two-dimensional code 98 is assigned to the actual instant film 20 to be specified. That is, with the display, on the screen 34, of the printed matter image 80 to which the sample image 82 is assigned, the user U1 can imagine an aspect in which the matrix type two-dimensional code 98 is printed on the actual instant film 20. In other words, it is possible to visually grasp at which position of the instant film 20 the matrix type two-dimensional code 98 is assigned.

The first display controller 48A composites the live view image 36 with the printed matter image 80 with the sample image 82 to generate a composite image 83 and displays the generated composite image 83 on the screen 34. For example, the composite image 83 is an image obtained by superimposing the printed matter image 80 with the sample image 82 on the live view image 36. The composite image 83 may be an image obtained by embedding the printed matter image 80 with the sample image 82 in the live view image 36.

The composite image 83 is an image in which the live view image 36 is used as a background image of the printed matter image 80, and the live view image 36 used for the printed matter image 80 is updated according to the specific frame rate.

In the present embodiment, the screen 34 is an example of a "first screen" according to the technique of the present disclosure. The printed matter image 80 is an example of a "first image" according to the technique of the present disclosure. The live view image 36 is an example of a "first video" and a "live view image" according to the technique of the present disclosure.

Figure 8:
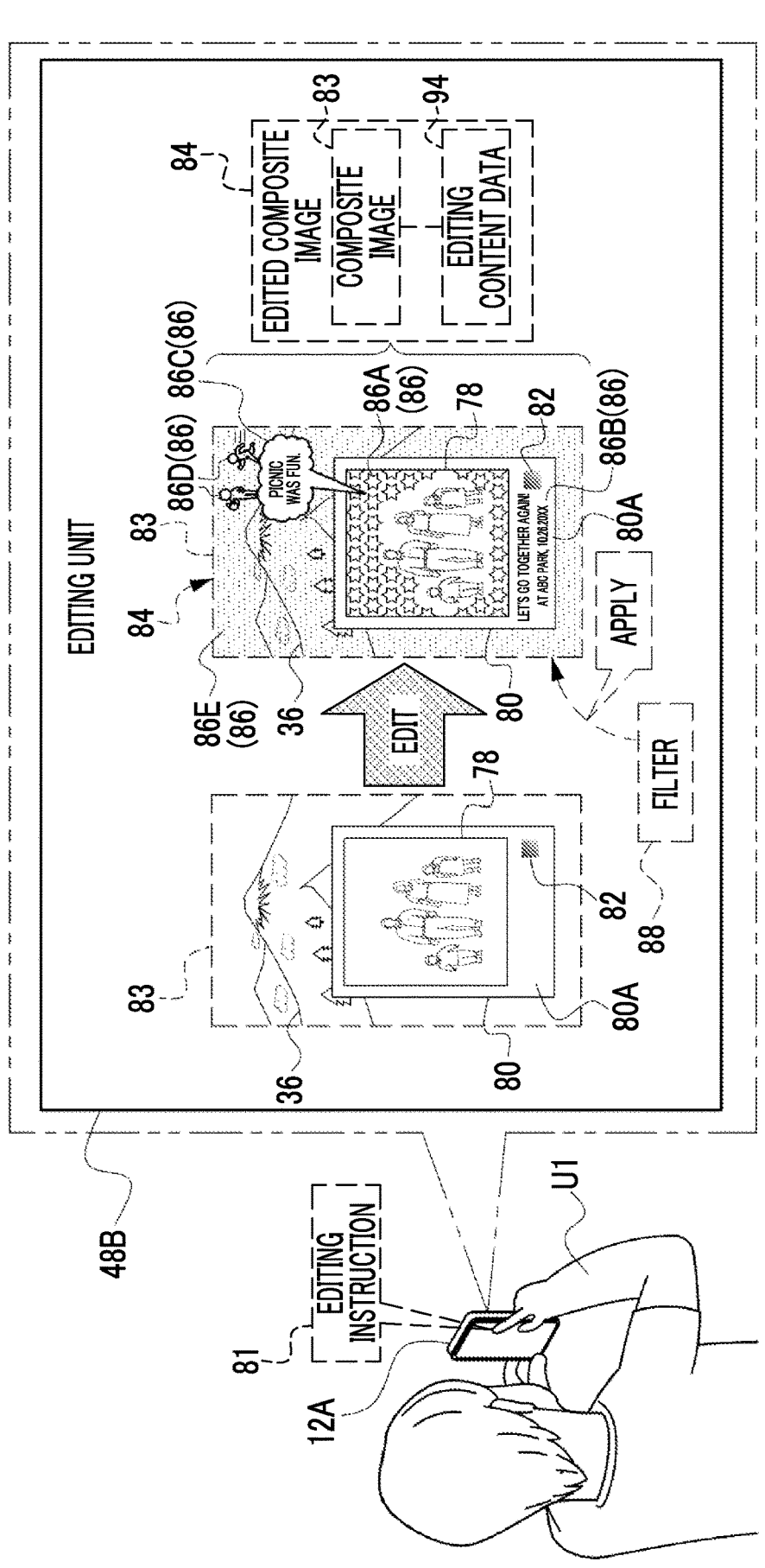
FIG. 8 is a conceptual diagram showing an example of a content of processing of an editing unit.

In a state where the composite image 83 is displayed on the screen 34, for example, as shown in FIG. 8, in a case where an editing instruction 81, which is an instruction to edit the inside of the screen 34 on which the composite image 83 is displayed, is provided for the smart device 12A from the user U1, the editing unit 48B edits the composite image 83 in response to the editing instruction 81. The inside of the screen 34 is edited by the editing of the composite image 83, and thus the visual impression of the printed matter image 80 is changed. The editing instruction 81 is an example of an "instruction" according to the technique of the present disclosure.

The editing unit 48B edits the composite image 83 to generate an edited composite image 84. The edited composite image 84 is configured to include the composite image 83 and editing content data 94. The editing content data 94 is data indicating editing content 86.

With the editing of the composite image 83 by the editing unit 48B, the editing content 86 is assigned to the composite image 83. An example of the editing content 86 includes an editing result (for example, a finally obtained result). The editing content 86 is defined by a pattern 86A, a text 86B, a pop-up image 86C, a virtual video 86D, a background image quality 86E, and the like.

In the example shown in FIG. 8, the pattern 86A is assigned to the print target image 78 to decorate the print target image 78. The pattern 86A may be a handwritten (for example, graffiti) pattern or a standard pattern. The text 86B is assigned to the margin region 80A to decorate the margin region 80A. The text 86B may be a handwritten (for example, graffiti) text or a standard text. The pop-up image 86C is an image that is popped up on the live view image 36 from within the print target image 78.

The virtual video 86D is a virtual video (that is, unreal video) generated by computer graphics and is assigned to the composite image 83 by the editing unit 48B. Since the live view image 36 is applied to the background image of the composite image 83, with the assignment of the virtual video 86D to the inside of the composite image 83, the edited composite image 84 is expressed as an augmented reality (AR) video. In the example shown in FIG. 8, the virtual video 86D is disposed on the pop-up image 86C.

The background image quality 86E is image quality of the live view image 36, and the inside of the screen 34 is edited by adjustment of the background image quality 86E by the editing unit 48B. A filter 88 is applied to the live view image 36 to realize the adjustment of the background image quality 86E. An example of the filter 88 includes an image conversion filter designated by the user U1. The image conversion filter refers to, for example, a filter that makes the live view image 36 monochrome, a filter that makes the live view image 36 sepia, a filter that makes the live view image 36 vivid, a filter that assigns blur, a filter that converts brightness, a filter that converts density, a filter that removes noise, and/or a filter that fills with an image or the like selected by the user U1. In the present embodiment, the filter 88 is an example of a "filter" and a "first filter" according to the technique of the present disclosure.

Figure 9:
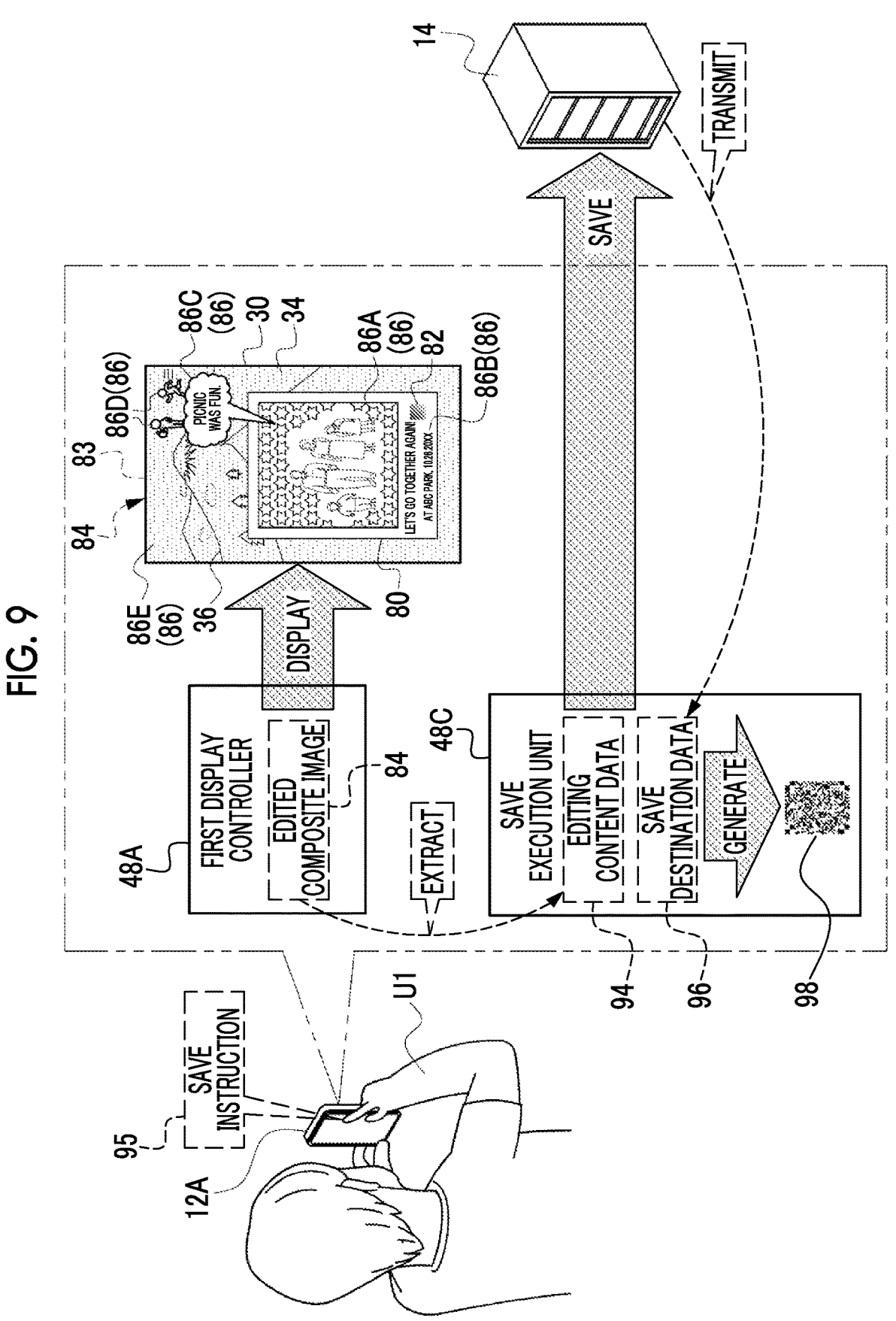
FIG. 9 is a conceptual diagram illustrating an example of an aspect in which editing content data is saved in a server and save destination data is transmitted from the server to the smart device.

As shown in FIG. 9 as an example, the first display controller 48A displays the edited composite image 84 obtained by the editing unit 48B on the screen 34. In this state, in a case where a save instruction 95, which is an instruction to save the editing content data 94, is assigned to the smart device 12A by the user U1, the save execution unit 48C extracts the editing content data 94 from the edited composite image 84 and saves the extracted editing content data 94 in the server 14. In a case where the saving of the editing content data 94 is completed, the server 14 transmits, to the smart device 12A, save destination data 96 that enables a save destination to be specified.

The save execution unit 48C acquires the save destination data 96 transmitted from the server 14 and acquires the matrix type two-dimensional code 98 based on the acquired save destination data 96. The save destination data 96 is encrypted to realize the acquisition of the matrix type two-dimensional code 98. An example of the matrix type two-dimensional code 98 includes a QR code (registered trademark). Here, the quick response (QR) code is illustrated, but this is merely an example. Any image that enables a save destination of the editing content data 94 to be specified may be employed. The matrix type two-dimensional code 98 is an example of a "second image" according to the technique of the present disclosure.

Figure 10:
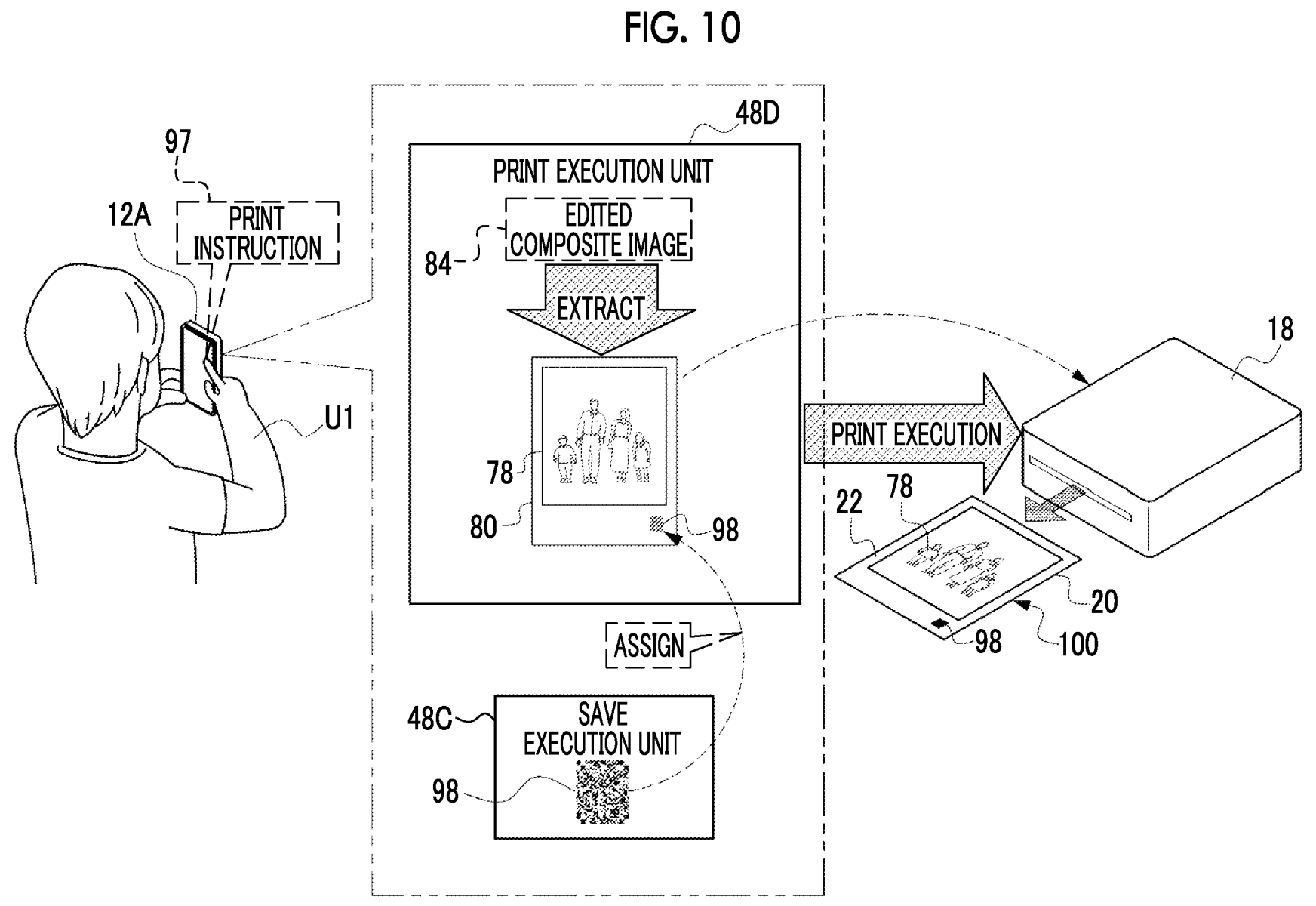

In a state where the edited composite image 84 is displayed on the screen 34, for example, as shown in FIG. 10, in a case where a print instruction 97, which is an instruction to print the printed matter image 80 on the surface 22 of the instant film 20, is provided for the smart device 12A from the user U1, the print execution unit 48D extracts the printed matter image 80 from the edited composite image 84. Further, the print execution unit 48D assigns the matrix type two-dimensional code 98 acquired by the save execution unit 48C to the printed matter image 80. A portion to which the matrix type two-dimensional code 98 is assigned is a portion to which the sample image 82 is assigned. That is, the print execution unit 48D replaces the sample image 82 with the matrix type two-dimensional code 98 to assign the matrix type two-dimensional code 98 to the printed matter image 80. The printed matter image 80 to which the matrix type two-dimensional code 98 is assigned is an example of a "third image" according to the technique of the present disclosure.

The print execution unit 48D outputs the printed matter image 80. An output destination is the printing device 18. Here, the printing device 18 is illustrated as the output destination. However, examples of the output destination include a storage device (for example, NVM or the like) built in the server 14 or the like, a portable type memory (for example, universal serial bus (USB) memory), and/or an electronic device such as a smart device 12B, in addition to the printing device 18.

The print execution unit 48D outputs the printed matter image 80 to the printing device 18 to cause the printing device 18 to print the printed matter image 80 including the matrix type two-dimensional code 98 on the surface 22 of the instant film 20. Accordingly, a printed matter 100 (business card-sized instant photograph in the example shown in FIG. 10) is generated by the printing device 18 and is discharged to the outside of the printing device 18. On the surface 22 of the printed matter 100, a layout of the print target image 78 and the matrix type two-dimensional code 98 is the same as a layout of the print target image 78 and the matrix type two-dimensional code 98 in the printed matter image 80. In the present embodiment, the printed matter 100 is an example of a "printed matter" according to the technique of the present disclosure.

Next, an example of processing content performed by the smart device 12B used by the user U2 will be described with reference to FIGS. 11 to 19.

Figure 11:
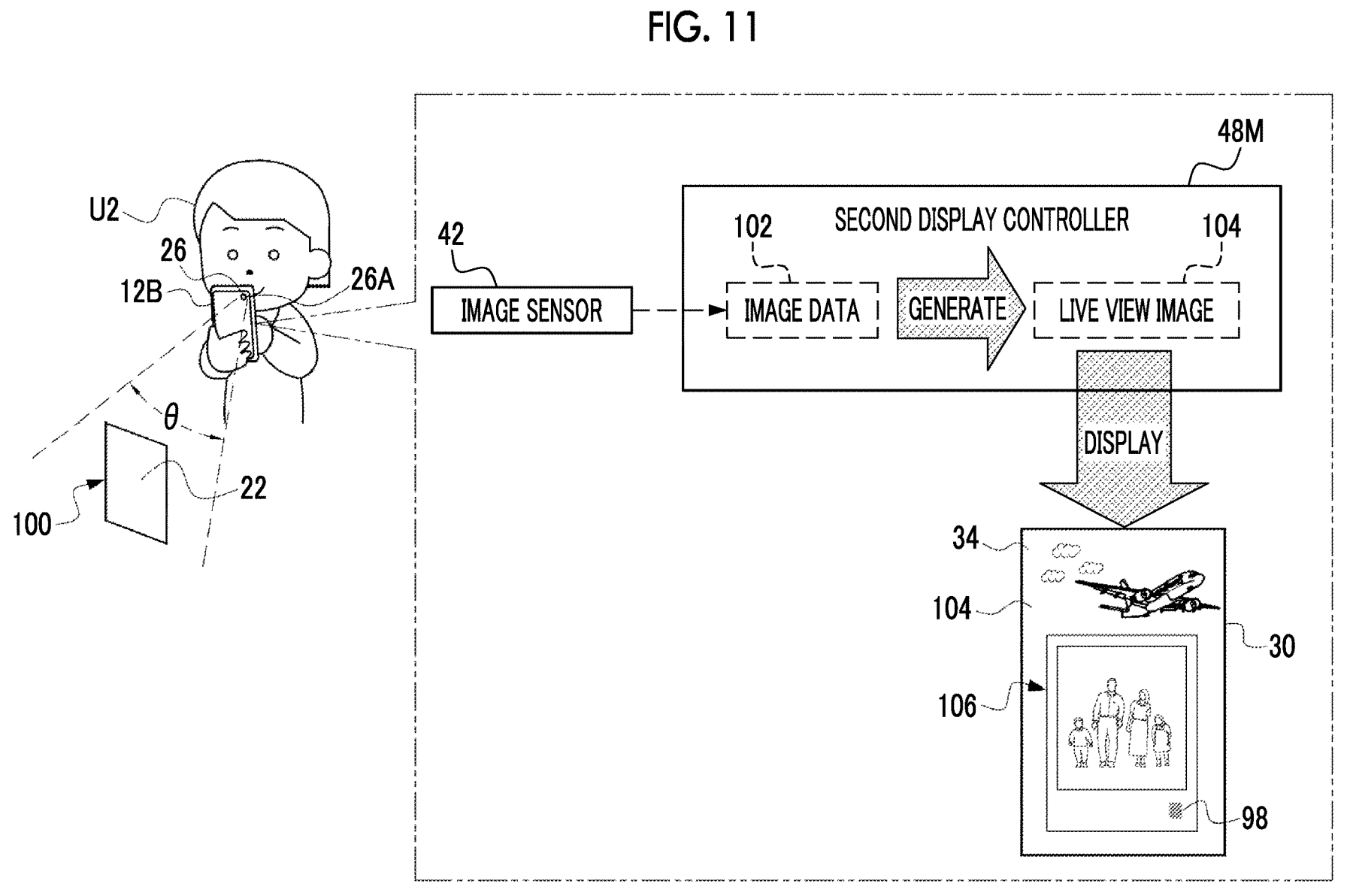

As shown in FIG. 11 as an example, in the smart device 12B, in a state where the printed matter 100 is included in the subject defined by an angle of view θ of the imaging apparatus 26 and an imaging surface 26A of the imaging apparatus 26 faces the surface 22 of the printed matter 100, the subject is captured by the image sensor 42. Accordingly, image data 102 is generated by the image sensor 42. A second display controller 48M generates a live view image 104 based on the image data 102 and displays the generated live view image 104 on the screen 34. The printed matter 100 is shown in the live view image 104. That is, the live view image 104 includes a printed matter image 106 showing the printed matter 100. In other words, the printed matter image 106 is displayed on the screen 34 in a live view mode together with the background image (image in which an airplane and clouds are shown in the example shown in FIG. 11). Further, the printed matter image 106 includes the matrix type two-dimensional code 98 as an electronic image. That is, the matrix type two-dimensional code 98 is also displayed on the screen 34 in the live view mode. In the present embodiment, the printed matter image 106 is an example of a "fourth image" according to the technique of the present disclosure. The live view image 104 is an example of a "second video" according to the technique of the present disclosure.

Figure 12:
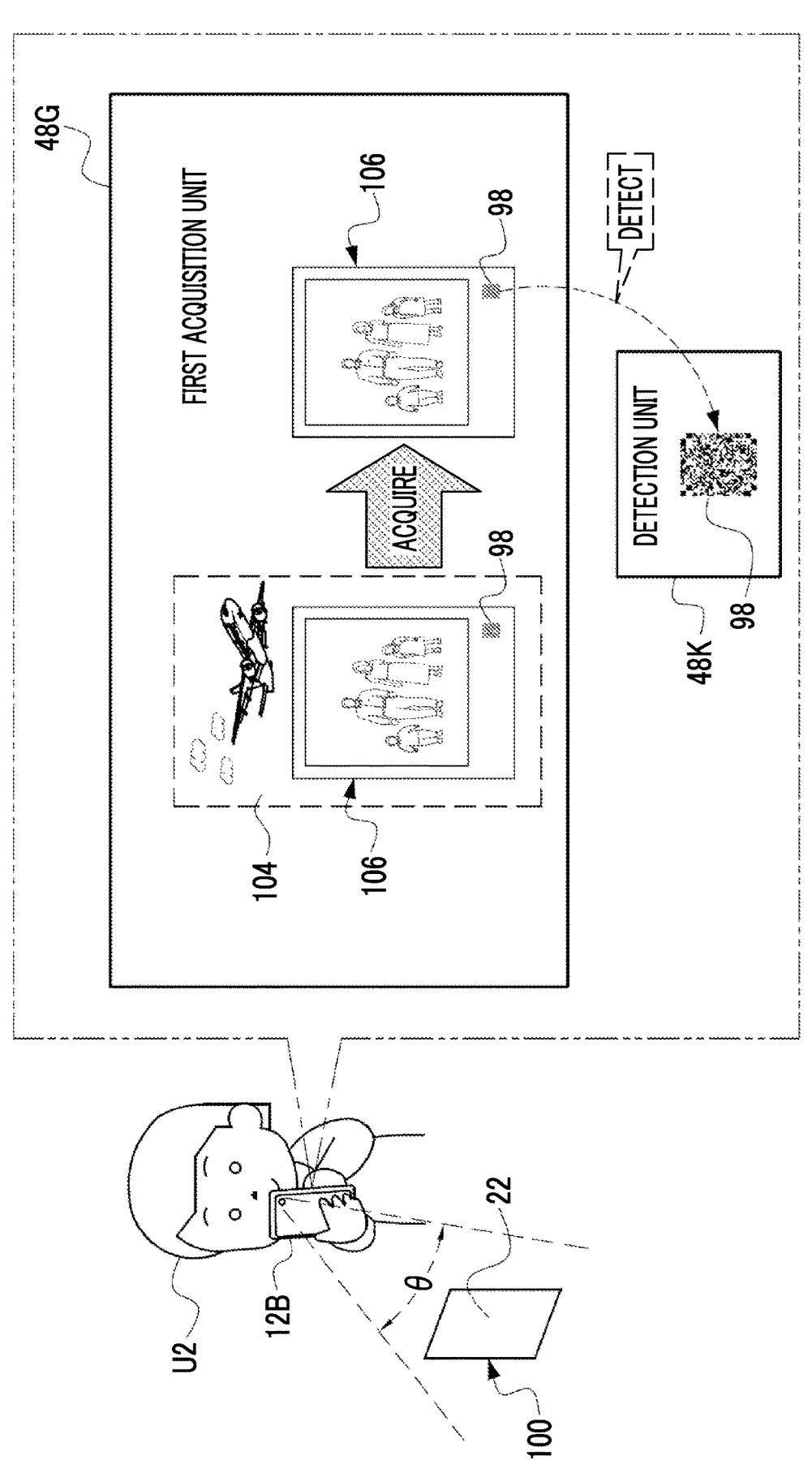
FIG. 12 is a conceptual diagram showing an example of an aspect in which the matrix type two-dimensional code is detected from the printed matter image acquired from the live view image.

As shown in FIG. 12 as an example, the first acquisition unit 48G acquires the printed matter image 106 from the live view image 104. The detection unit 48K detects the matrix type two-dimensional code 98 from the printed matter image 106 acquired by the first acquisition unit 48G.

Figure 13:
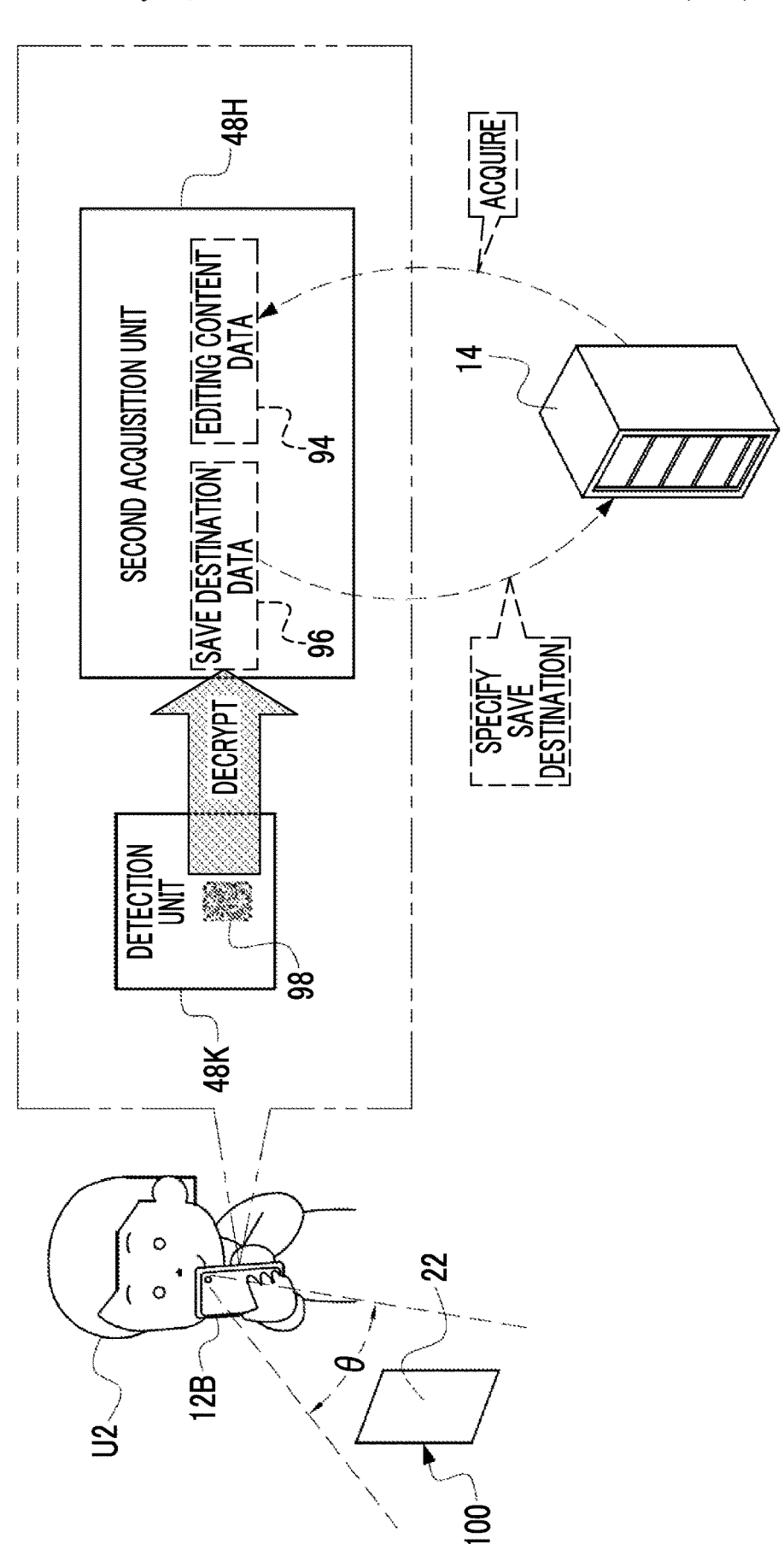
FIG. 13 is a conceptual diagram showing an example of an aspect in which a save destination where the editing content data is saved is specified by using the matrix type two-dimensional code detected from the printed matter image and the editing content data is acquired from the specified save destination.

As shown in FIG. 13 as an example, the second acquisition unit 48H acquires the editing content data 94 from the server 14 based on the matrix type two-dimensional code 98 detected by the detection unit 48K. That is, the second acquisition unit 48H decrypts (that is, decodes) the matrix type two-dimensional code 98 to acquire the save destination data 96 from the matrix type two-dimensional code 98 and specifies the save destination (that is, place in the server 14 in which the editing content data 94 is stored) of the editing content data 94 from the save destination data 96. The second acquisition unit 48H acquires the editing content data 94 from the specified save destination.

As shown in FIG. 14 as an example, the second display controller 48M performs first display processing 108. The first display processing 108 is processing of displaying, on the screen 34, the printed matter image 106 and the editing content 86 indicated by the editing content data 94. The first display processing 108 is an example of "first display processing" and "third display processing" according to the technique of the present disclosure.

The first display processing 108 includes live-view display processing 108A and editing content application processing 108B. The live-view display processing 108A is an example of "third processing" according to the technique of the present disclosure, and the editing content application processing 108B is an example of "fourth processing" according to the technique of the present disclosure.

The live-view display processing 108A is processing of displaying, on the screen 34, the live view image 104 including the printed matter image 106. The editing content application processing 108B is processing of applying the editing content 86 (that is, the pattern 86A, the text 86B, the pop-up image 86C, the virtual video 86D, the background image quality 86E, and the like) to the live view image 104.

The background image quality 86E is applied to the background image of the printed matter image 106 in the live view image 104. In this case, with the application of the filter 88 to the background image of the printed matter image 106 in the live view image 104, the image quality of the background image of the printed matter image 106 is adjusted. Here, the filter 88 applied to the background image of the printed matter image 106 in the live view image 104 is an example of a "second filter corresponding to first filter" according to the technique of the present disclosure.

Here, a form example has been described in which the filter 88 itself used for adjusting the background image quality 86E shown in FIG. 8 is used for adjusting the background image quality 86E shown in FIG. 14, but this is merely an example. For example, the second display controller 48M may generate a filter used for adjusting the background image quality 86E shown in FIG. 14 with reference to a parameter of the filter 88 used for adjusting the background image quality 86E shown in FIG. 8, or may adjust a parameter of an existing filter with reference to the parameter of the filter 88 used for adjusting the background image quality 86E shown in FIG. 8 to use the filter whose parameter is adjusted for the adjustment of the background image quality 86E shown in FIG. 14.

Figure 15:
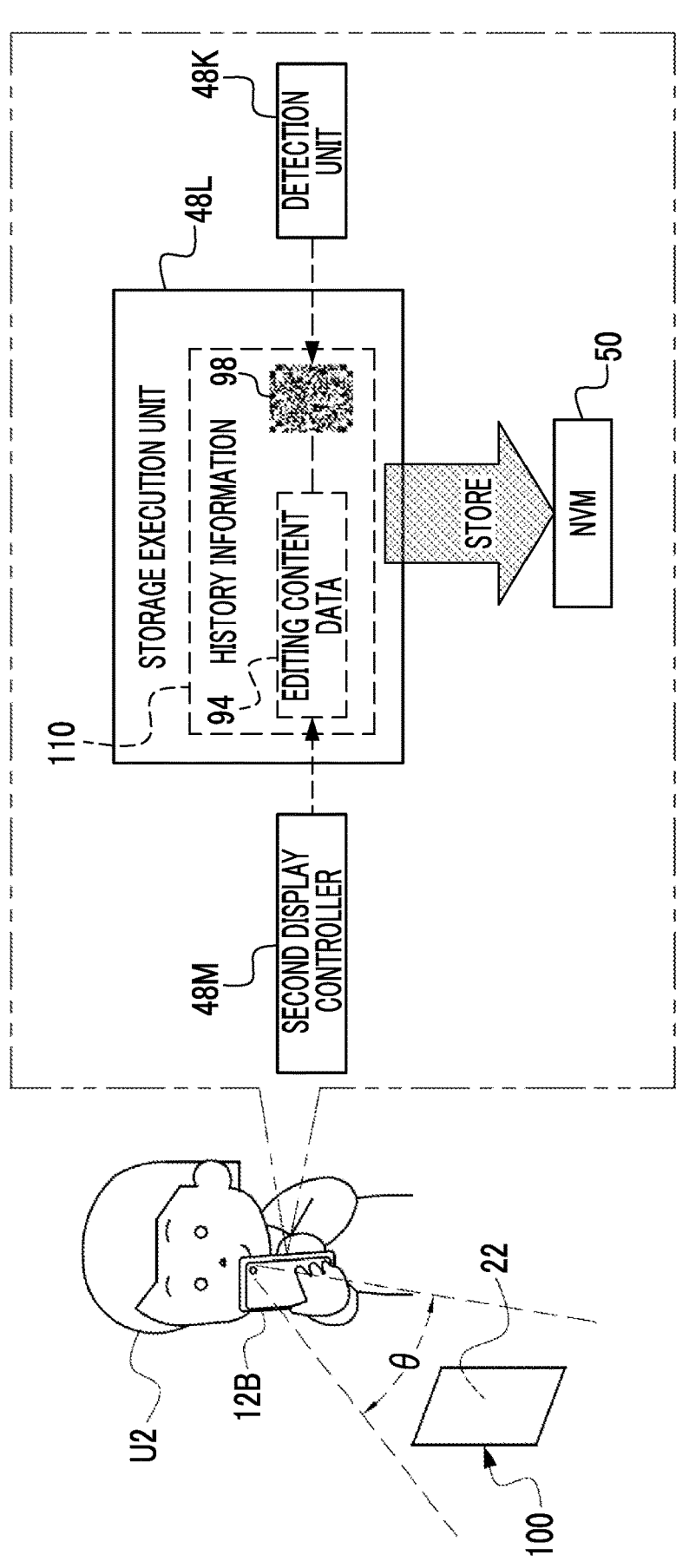
FIG. 15 is a conceptual diagram showing an example of an aspect in which history information is generated and stored in an NVM.

As shown in FIG. 15 as an example, the storage execution unit 48L acquires history information 110 and stores the acquired history information 110 in the NVM 50. The storing of the editing content data 94 in the NVM 50 is realized offline. Further, the history information 110 is generated based on the editing content data 94 and the matrix type two-dimensional code 98 to realize the acquisition of the history information 110. The history information 110 is information in which the editing content data 94 and the matrix type two-dimensional code 98 corresponding to each other are associated with each other. An example of the editing content data 94 and the matrix type two-dimensional code 98 corresponding to each other includes the editing content data 94 used by the second display controller 48M and the matrix type two-dimensional code 98 used to obtain the editing content data 94 from the server 14. The history information 110 may be periodically generated and stored in the NVM 50, or may be generated each time the detection unit 48K detects the matrix type two-dimensional code 98 and the second acquisition unit 48H acquires the editing content data 94 from the server 14 and stored in the NVM 50. The history information 110 is an example of "history information" according to the technique of the present disclosure.

Figure 16:
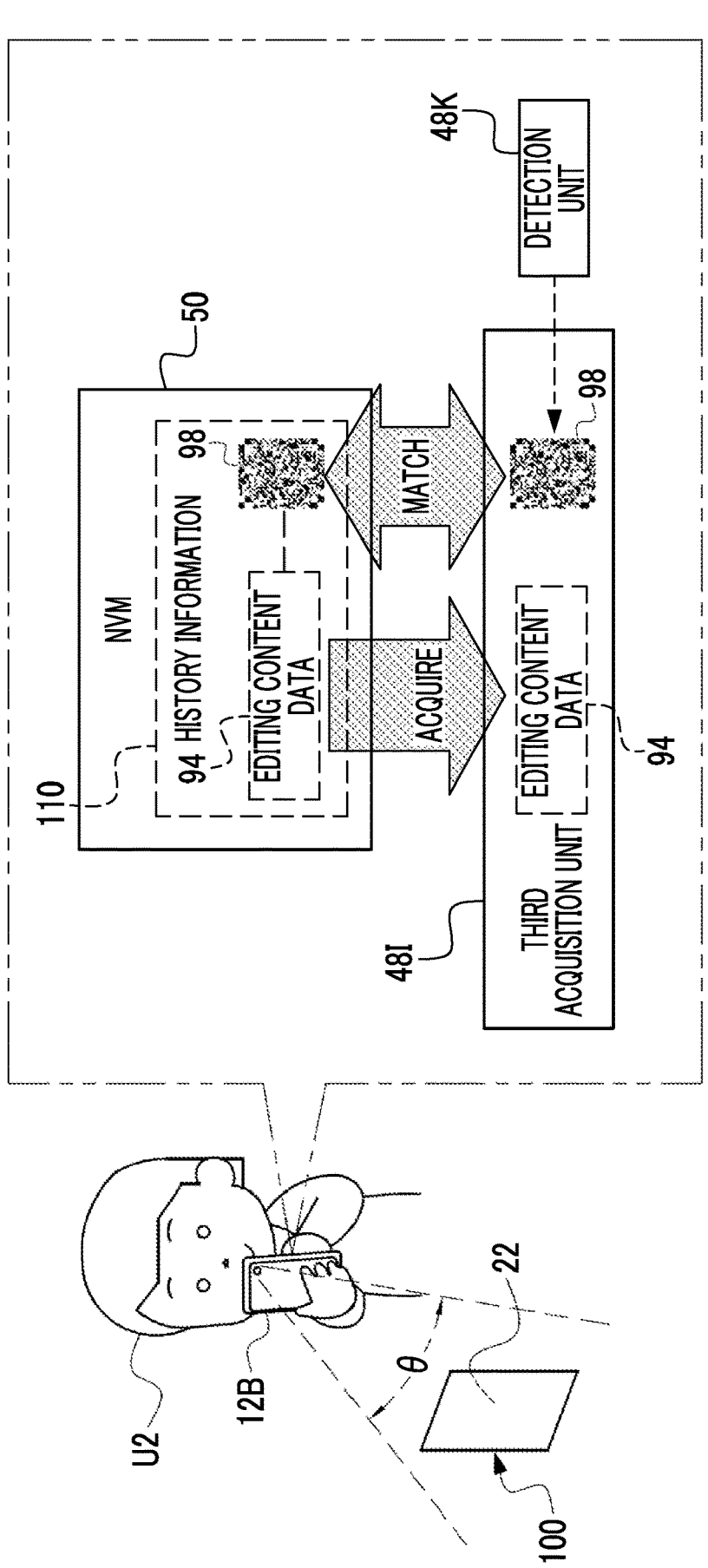
FIG. 16 is a conceptual diagram showing an example of an aspect in which the editing content data is acquired from the history information.

As shown in FIG. 16 as an example, the history information 110 is stored in the NVM 50. In a case where the detection unit 48K detects the matrix type two-dimensional code 98 in this state, the third acquisition unit 48I acquires, from the history information 110, the editing content data 94 corresponding to the matrix type two-dimensional code 98 detected by the detection unit 48K. That is, the third acquisition unit 48I acquires the editing content data 94 from the history information 110, of the history information 110 stored in the NVM 50, including the matrix type two-dimensional code 98 that matches the matrix type two-dimensional code 98 detected by the detection unit 48K. The acquisition of the editing content data 94 from the history information 110 is realized offline.

Figure 17:
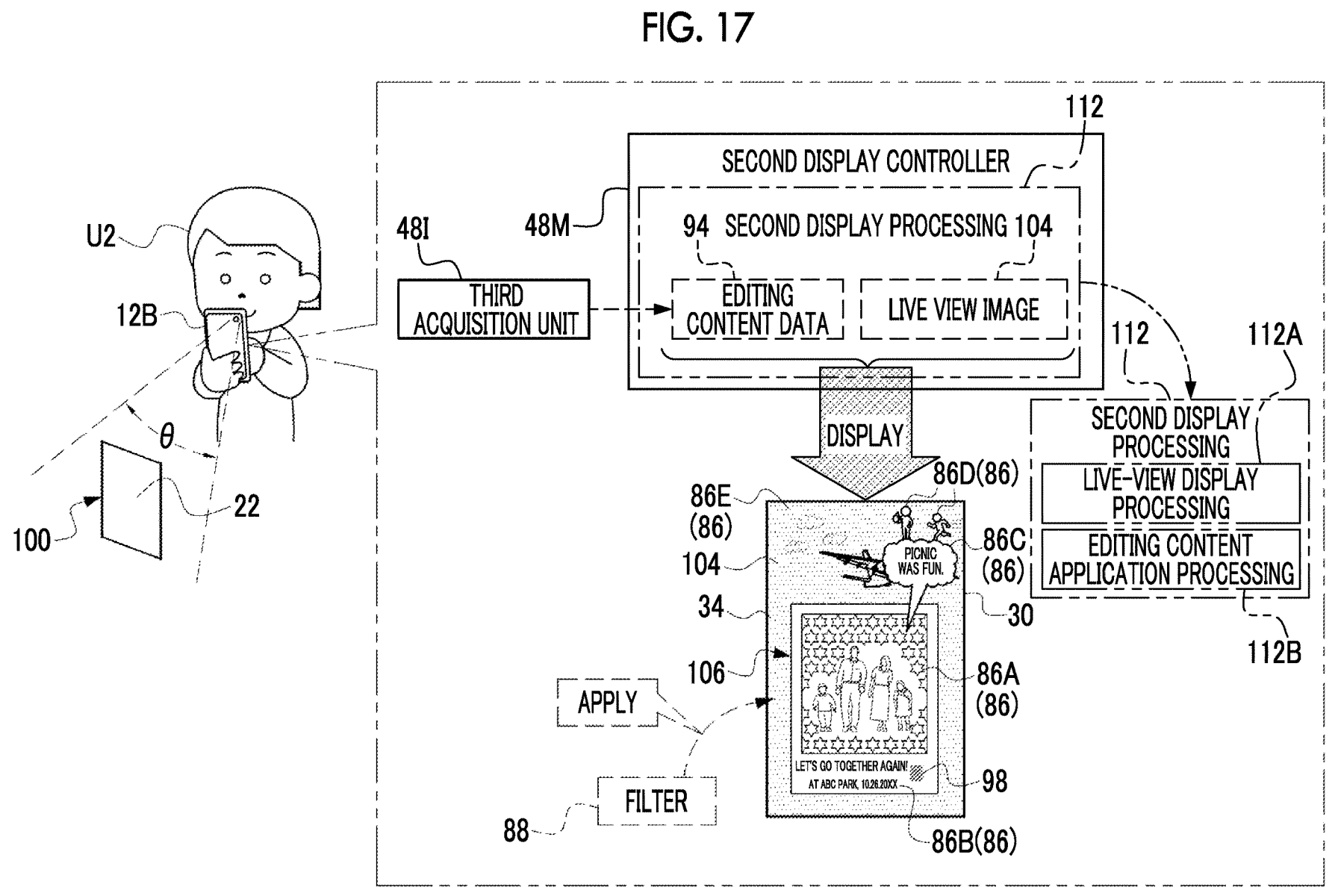

As shown in FIG. 17 as an example, the second display controller 48M performs second display processing 112. The second display processing 112 is processing of displaying, on the screen 34, the printed matter image 106 and the editing content 86 indicated by the editing content data 94 acquired by the third acquisition unit 48I. The second display processing 112 is an example of "second display processing" according to the technique of the present disclosure.

The second display processing 112 includes live-view display processing 112A and editing content application processing 112B. The live-view display processing 112A is an example of "first processing" according to the technique of the present disclosure, and the editing content application processing 112B is an example of "second processing" according to the technique of the present disclosure.

The live-view display processing 112A is processing corresponding to the live-view display processing 108A shown in FIG. 14. The editing content application processing 112B is processing of applying, to the live view image 104, the editing content 86 (that is, the pattern 86A, the text 86B, the pop-up image 86C, the virtual video 86D, the background image quality 86E, and the like) indicated by the editing content data 94 acquired by the third acquisition unit 48I. The background image quality 86E included in the editing content 86 indicated by the editing content data 94 acquired by the third acquisition unit 48I is applied to the background image of the printed matter image 106 in the live view image 104 in the same manner as the editing content application processing 108B shown in FIG. 14.

Figure 18:
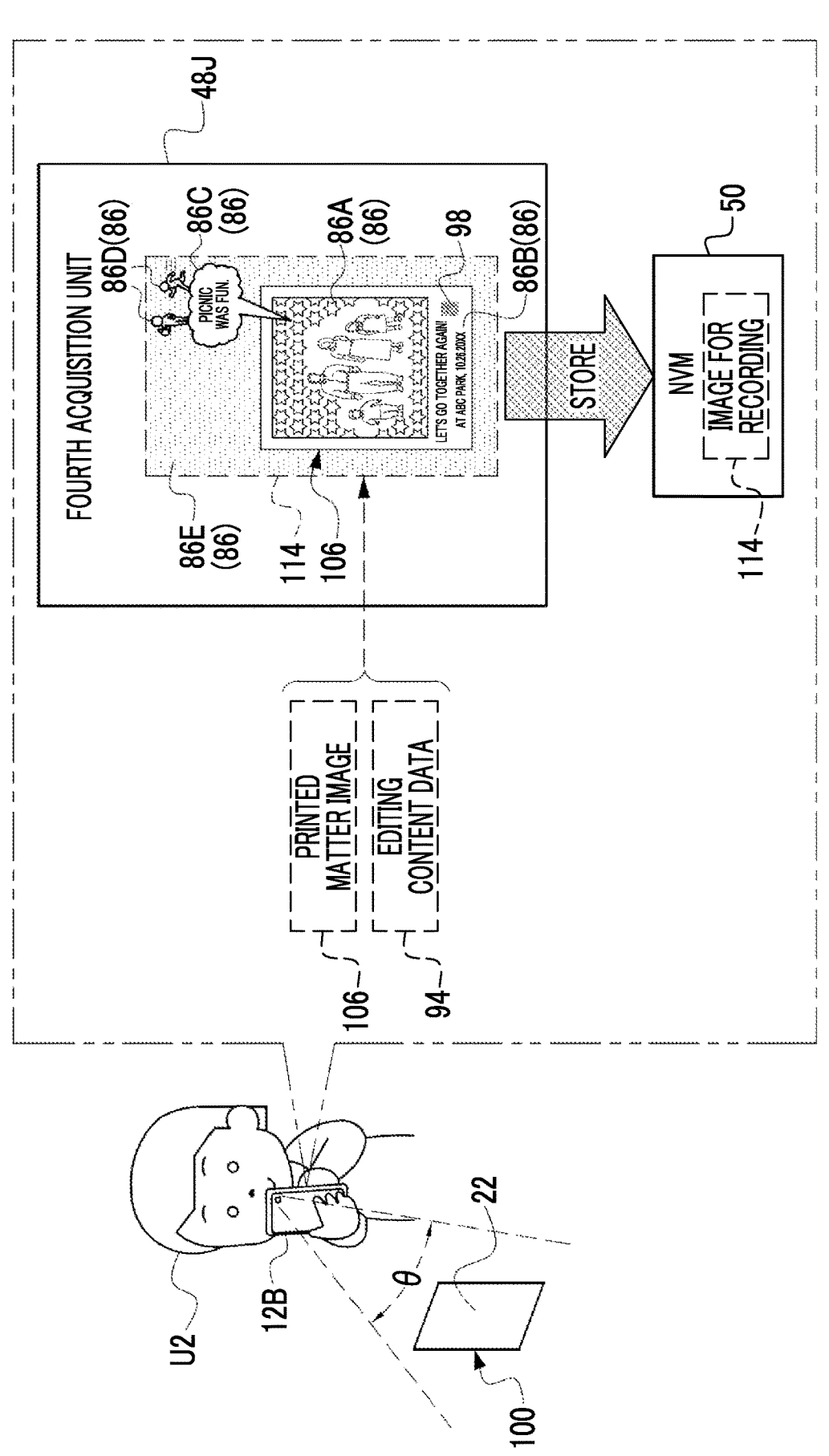
FIG. 18 is a conceptual diagram showing an example of an aspect in which an image for recording obtained by applying the editing content to the printed matter image is stored in the NVM.

As shown in FIG. 18 as an example, the fourth acquisition unit 48J acquires, as an image for recording 114, an image obtained by reflecting the editing content 86 (that is, the pattern 86A, the text 86B, the pop-up image 86C, the virtual video 86D, the background image quality 86E, and the like) on the printed matter image 106. The fourth acquisition unit 48J stores the image for recording 114 in the NVM 50. The image for recording 114 may be a still image for recording (for example, still image for reproduction) or a video for recording (for example, video for reproduction). For example, whether the still image for recording is generated as the image for recording 114 and stored in the NVM 50 or the video for recording is generated as the image for recording 114 and stored in the NVM 50 may be determined according to an instruction provided to the smart device 12B from the user U2 or may be set by default.

Figure 19:
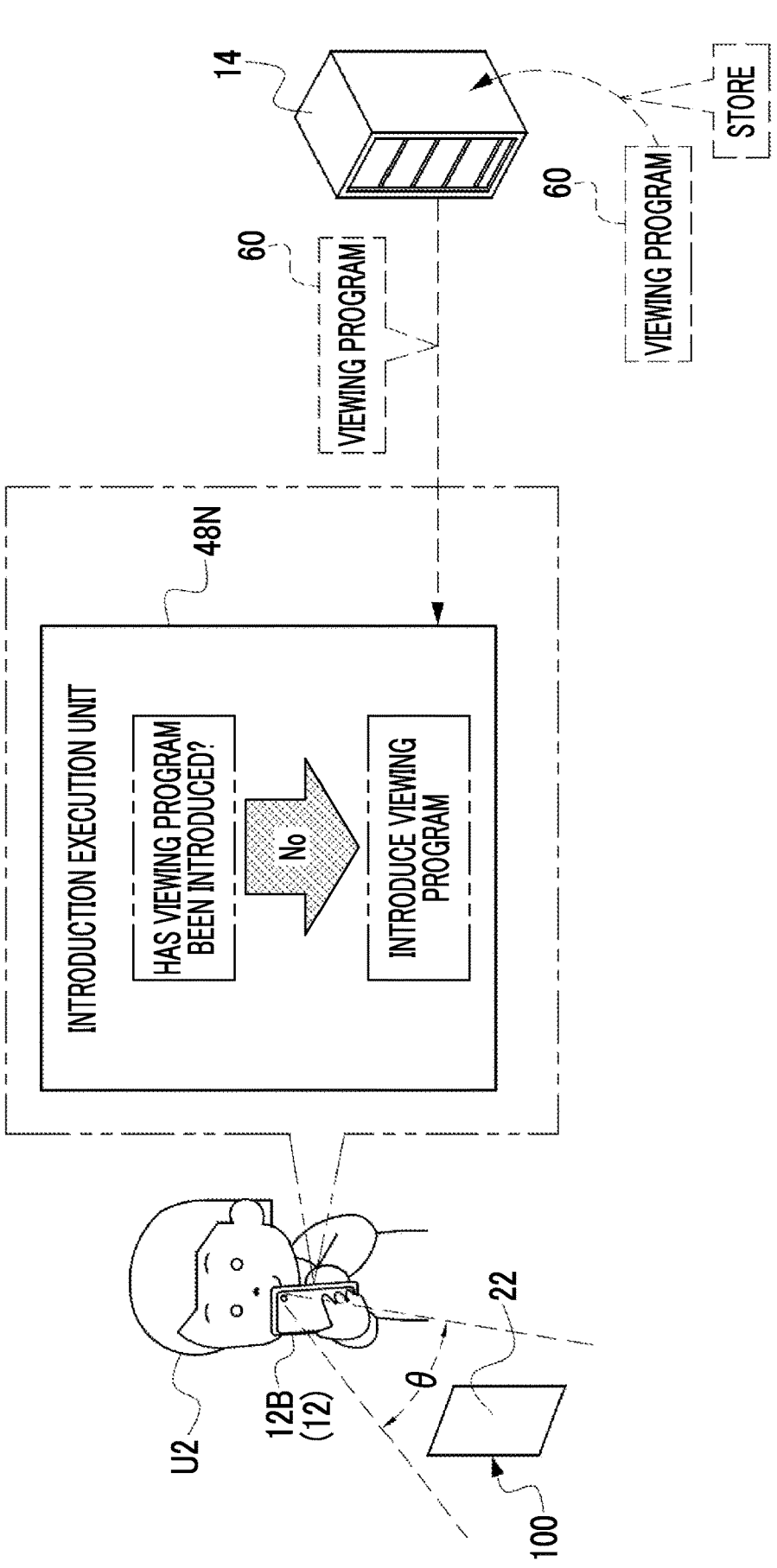
FIG. 19 is a conceptual diagram showing an example of an aspect in which a viewing program is introduced.

As shown in FIG. 19 as an example, the introduction execution unit 48N determines whether or not the viewing program 60 has already been introduced into the computer 40. A case where the viewing program 60 has already been introduced refers to, for example, a case where the viewing program 60 is stored in the NVM 50 in an executable state. In a case where determination is made that the viewing program 60 has not been introduced in the computer 40, the introduction execution unit 48N introduces the viewing program 60. For example, in a case where the viewing program 60 is stored in the server 14, the introduction execution unit 48N downloads the viewing program 60 from the server 14 and installs the downloaded viewing program 60 in the computer 40.

Next, an action of a portion of the image processing system 10 according to the technique of the present disclosure will be described with reference to FIGS. 20 to 22.

First, an action of a portion of the smart device 12A according to the technique of the present disclosure will be described with reference to FIG. 20. A flow of the editing processing shown in FIG. 20 is an example of an "editing method" according to the technique of the present disclosure.

Figure 20:
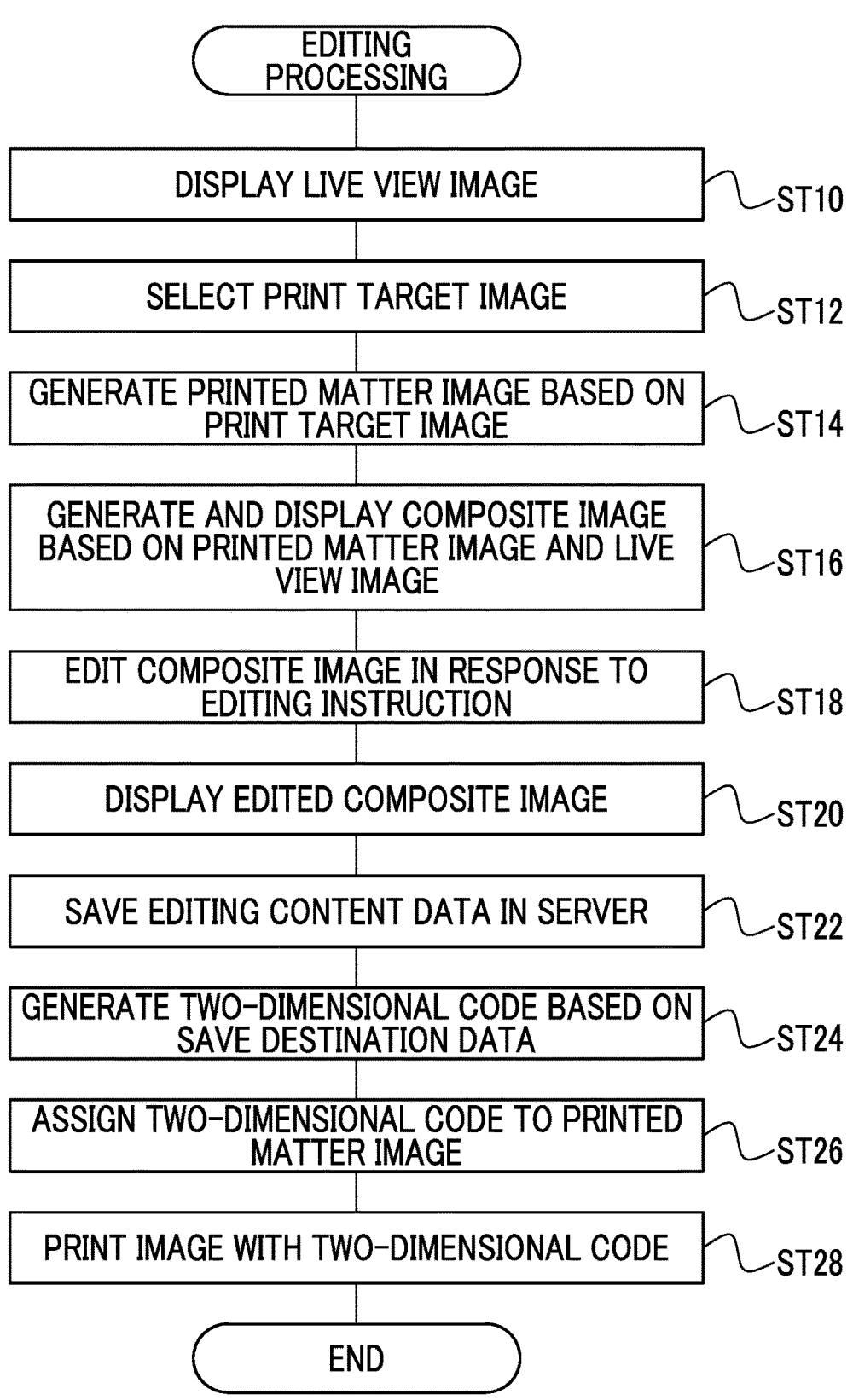
FIG. 20 is a flowchart showing an example of a flow of editing processing.

In the editing processing shown in FIG. 20, first, in step ST10, the first display controller 48A acquires the image data 56 from the image sensor 42, generates the live view image 36 based on the acquired image data 56, and displays the generated live view image 36 on the screen 34 (refer to FIG. 6). After the processing in step ST10 is executed, the editing processing shifts to step ST12.

In step ST12, the first display controller 48A selects the print target image 78 in response to the selection instruction 79 provided to the smart device 12A. After the processing in step ST12 is executed, the editing processing shifts to step ST14.

In step ST14, the first display controller 48A generates the printed matter image 80 based on the print target image 78 selected in step ST12 (refer to FIG. 7). After the processing in step ST14 is executed, the editing processing shifts to step ST16.

In step ST16, the first display controller 48A generates the composite image 83, based on the printed matter image 80 generated in step ST14 and the live view image 36, and displays the generated composite image 83 on the screen 34 (refer to FIG. 7). After the processing in step ST16 is executed, the editing processing shifts to step ST18.

In step ST18, the editing unit 48B edits the composite image 83 in response to the editing instruction 81 provided to the smart device 12A. Accordingly, the edited composite image 84 is generated (refer to FIG. 8). After the processing in step ST18 is executed, the editing processing shifts to step ST20.

In step ST20, the first display controller 48A displays the edited composite image 84 on the screen 34 (refer to FIG. 9). After the processing in step ST20 is executed, the editing processing shifts to step ST22.

In step ST22, the save execution unit 48C acquires the editing content data 94 from the edited composite image 84 and saves the acquired editing content data 94 in the server 14 (refer to FIG. 9). In response to this, the server 14 transmits the save destination data 96 to the smart device 12A (refer to FIG. 9). After the processing in step ST22 is executed, the editing processing shifts to step ST24.

In step ST24, the save execution unit 48C acquires the save destination data 96 transmitted from the server 14 and generates the matrix type two-dimensional code 98 based on the save destination data 96 (refer to FIG. 9). After the processing in step ST24 is executed, the editing processing shifts to step ST26.

In step ST26, the print execution unit 48D extracts the printed matter image 80 from the edited composite image 84. The print execution unit 48D assigns the matrix type two-dimensional code 98 generated in step ST24 to the printed matter image 80 (refer to FIG. 10). After the processing in step ST26 is executed, the editing processing shifts to step ST28.

In step ST28, the print execution unit 48D causes the printing device 18 to print the printed matter image 80 to which the matrix type two-dimensional code 98 is assigned. Accordingly, the printing device 18 generates the printed matter 100 and discharges the printed matter 100 to the outside of the printing device 18 (refer to FIG. 10). After the processing in step ST28 is executed, the editing processing ends.

Next, an action of a portion of the smart device 12B according to the technique of the present disclosure will be described with reference to FIG. 21. A flow of the viewing processing shown in FIG. 21 is an example of an "image processing method" according to the technique of the present disclosure.

Figure 21:
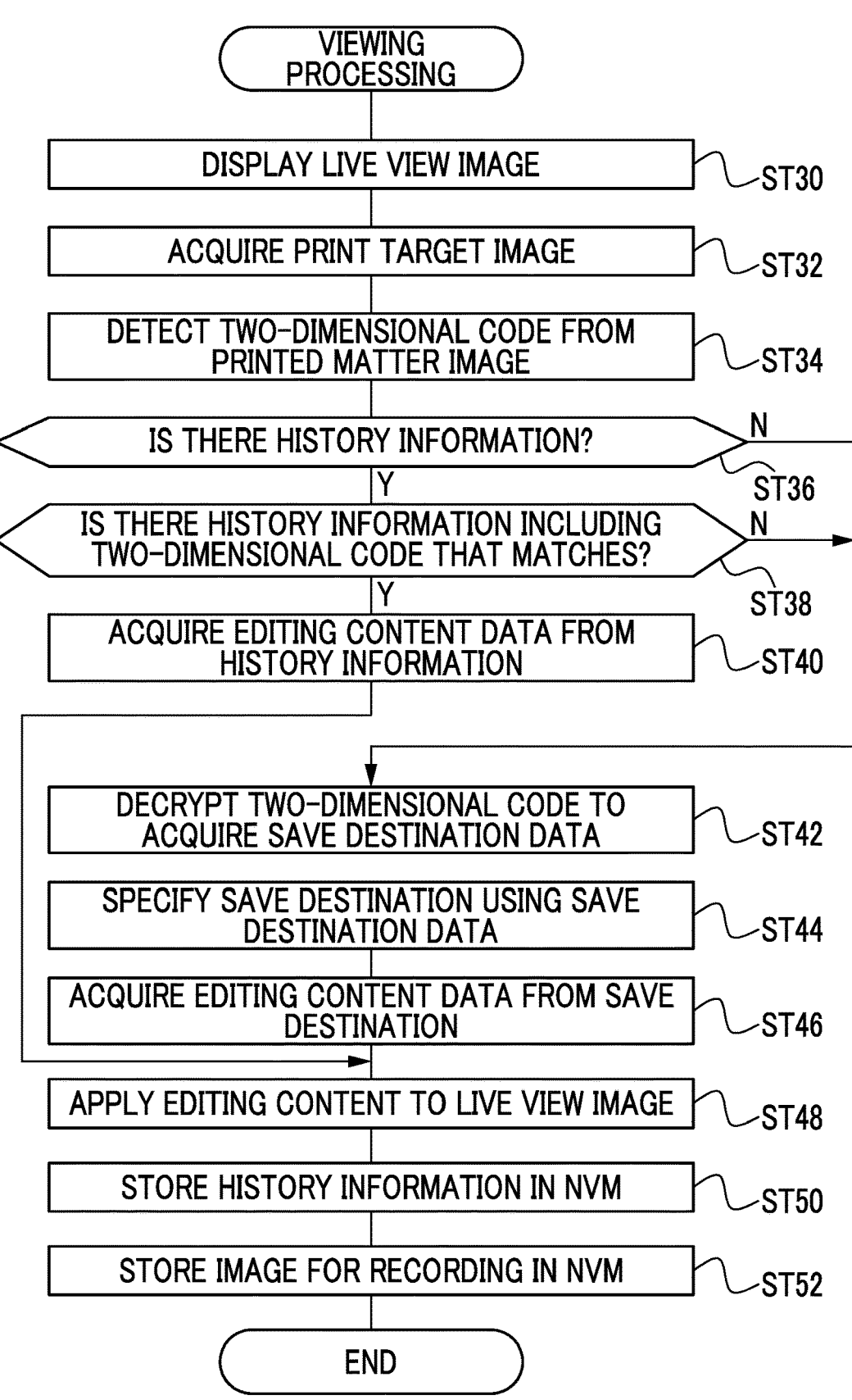
FIG. 21 is a flowchart showing an example of a flow of viewing processing.

In the viewing processing shown in FIG. 21, first, in step ST30, the second display controller 48M acquires the image data 102 from the image sensor 42, generates the live view image 104 based on the acquired image data 102, and displays the generated live view image 104 on the screen 34 (refer to FIG. 11). After the processing in step ST30 is executed, the viewing processing shifts to step ST32.

In step ST32, the first acquisition unit 48G acquires the printed matter image 106 from the live view image 104 (refer to FIG. 12). After the processing in step ST32 is executed, the viewing processing shifts to step ST34.

In step ST34, the detection unit 48K detects the matrix type two-dimensional code 98 from the printed matter image 106 acquired in step ST32 (refer to FIG. 12). After the processing in step ST34 is executed, the viewing processing shifts to step ST36.

In step ST36, the third acquisition unit 48I determines whether or not the history information 110 is stored in the NVM 50. In step ST36, in a case where the history information 110 is not stored in the NVM 50, negative determination is made, and the viewing processing shifts to step ST42. In step ST36, in a case where the history information 110 is stored in the NVM 50, positive determination is made, and the viewing processing shifts to step ST38.

In step ST38, the third acquisition unit 48I determines whether or not the history information 110 including the matrix type two-dimensional code 98 that matches the matrix type two-dimensional code 98 detected in step ST34 is stored in the NVM 50. In step ST38, in a case where the history information 110 including the matrix type two-dimensional code 98 that matches the matrix type two-dimensional code 98 detected in step ST34 is not stored in the NVM 50, negative determination is made, and the viewing processing shifts to step ST42. In step ST38, in a case where the history information 110 including the matrix type two-dimensional code 98 that matches the matrix type two-dimensional code 98 detected in step ST34 is stored in the NVM 50, positive determination is made, and the viewing processing shifts to step ST40.

In step ST40, the third acquisition unit 48I acquires the editing content data 94 from the history information 110 including the matrix type two-dimensional code 98 that matches the matrix type two-dimensional code 98 detected in step ST34 (refer to FIG. 16). After the processing in step ST40 is executed, the viewing processing shifts to step ST48.

In step ST42, the second acquisition unit 48H decrypts the matrix type two-dimensional code 98 detected in step ST34 to acquire the save destination data 96 (refer to FIG. 13). After the processing in step ST42 is executed, the viewing processing shifts to step ST44.

In step ST44, the second acquisition unit 48H specifies the save destination of the editing content data 94 using the save destination data 96 acquired in step ST42 (refer to FIG. 13). After the processing in step ST44 is executed, the viewing processing shifts to step ST46.

In step ST46, the second acquisition unit 48H acquires the editing content data 94 from the save destination specified in step ST44 (refer to FIG. 13). After the processing in step ST46 is executed, the viewing processing shifts to step ST48.

In step ST48, the second display controller 48M applies, to the live view image 104, the editing content 86 indicated by the editing content data 94 acquired in step ST40 or step ST46 (refer to FIGS. 14 and 17). After the processing in step ST48 is executed, the viewing processing shifts to step ST50.

In step ST50, the storage execution unit 48L associates the editing content data 94 acquired in step ST40 or step ST46 with the matrix type two-dimensional code 98 detected in step ST34 to generate the history information 110 and stores the generated history information 110 in the NVM 50 (refer to FIG. 15). After the processing in step ST50 is executed, the viewing processing shifts to step ST52.

In step ST52, the fourth acquisition unit 48J reflects, on the printed matter image 106 acquired in step ST32, the editing content 86 indicated by the editing content data 94 acquired in step ST40 or step ST46 to generate the image for recording 114. The fourth acquisition unit 48J stores the image for recording 114 in the NVM 50 (refer to FIG. 18). After the processing in step ST52 is executed, the viewing processing ends.

Next, an action of a portion of the smart device 12B according to the technique of the present disclosure will be described with reference to FIG. 22.

Figure 22:
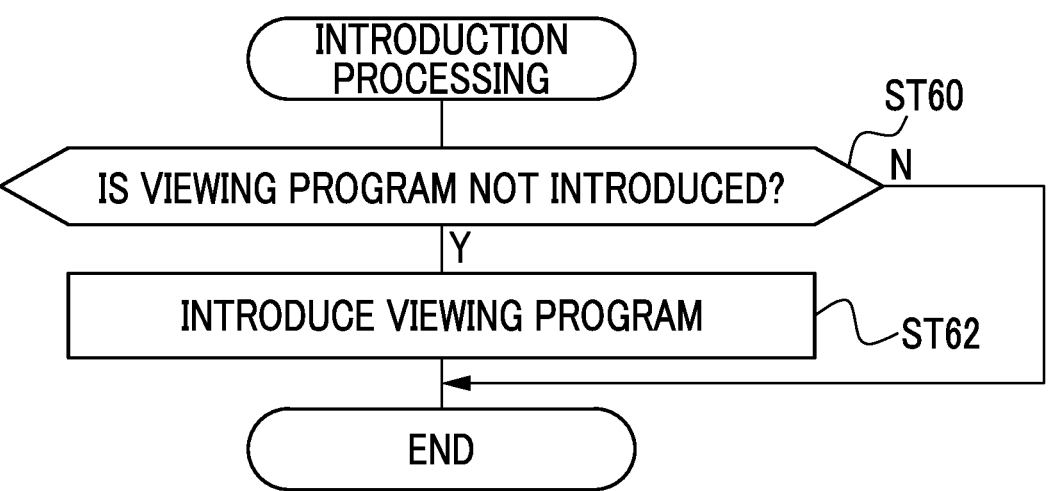
FIG. 22 is a flowchart showing an example of a flow of introduction processing.

In the introduction processing shown in FIG. 22, in step ST60, the introduction execution unit 48N determines whether or not the viewing program 60 is introduced in the computer 40. In step ST60, in a case where the viewing program 60 is introduced into the computer 40, negative determination is made, and the introduction processing ends. In step ST60, in a case where the viewing program 60 is not introduced into the computer 40, positive determination is made, and the introduction processing shifts to step ST62.

In step ST62, the introduction execution unit 48N acquires the viewing program 60 from the server 14 and introduces the acquired viewing program 60 into the computer 40. After the processing in step ST62 is executed, the introduction processing ends.

As described above, in the smart device 12A, the printed matter image 80 is displayed on the screen 34, and the live view image 36 is displayed as the background image of the printed matter image 80. In a state where the printed matter image 80 and the live view image 36 are displayed on the screen 34 (that is, state where the composite image 83 is displayed on the screen 34), the inside of the screen 34 (that is, the composite image 83) is edited in response to the editing instruction 81 provided to the smart device 12A. Accordingly, the user U1 can edit the inside of the screen 34 (that is, composite image 83) in a state where the printed matter image 80 displayed on the screen 34 of the smart device 12A and the live view image 36 displayed as the background image of the printed matter image 80 are visually comparable with each other. As a result, the user U1 can specifically imagine a degree of visual effect, on the user U2, of the editing content 86 reflected on the inside of the screen 34 (that is, the live view image 104 including the printed matter image 106) of the smart device 12B (that is, what kind of impression the user U2 has on the editing content 86).

Further, in the smart device 12A, the editing content 86 obtained by editing the inside of the screen 34 is displayed on the screen 34. Accordingly, it is possible to cause the user U1 to visually recognize the editing content 86 obtained by editing the inside of the screen 34.

Further, in the smart device 12A, the visual impression of the printed matter image 80 can be changed by the editing of the inside of the screen 34. Accordingly, it is possible to easily change the visual impression of the printed matter image 80.

Further, in the smart device 12A, the inside of the screen 34 is edited by the adjustment of the image quality of the live view image 36. Accordingly, it is possible to change the visual impression of the printed matter image 80 in the screen 34.

Further, in the smart device 12A, the image quality of the live view image 36 is adjusted by the processing (that is, editing content application processing 108B) using the filter 88 on the live view image 36. Accordingly, it is possible to easily adjust the image quality of the live view image 36.

Further, in the smart device 12A, the inside of the screen 34 is edited by the assignment of the virtual video 86D to the inside of the screen 34. Accordingly, it is possible to obtain the edited composite image 84 having a high degree of interest.

Further, in the smart device 12A, the matrix type two-dimensional code 98, which is obtained by encrypting the save destination data 96 that enables the save destination of the editing content data 94 to be specified, is assigned to the printed matter image 80. The printed matter image 80 to which the matrix type two-dimensional code 98 is assigned is output as the printed matter 100. Therefore, the user can specify the save destination of the editing content data 94 by using the matrix type two-dimensional code 98 shown in the printed matter 100.

Further, in the smart device 12A, the sample image 82 is assigned to the printed matter image 80 before the matrix type two-dimensional code 98 is assigned to the printed matter image 80. The printed matter image 80 to which the sample image 82 is assigned is displayed on the screen 34. Accordingly, the user U1 can imagine at which portion of the printed matter image 80 the matrix type two-dimensional code 98 is assigned. As a result, for example, it is possible to grasp the impression received by a person other than the user U1 (for example, user U2) from the matrix type two-dimensional code 98 assigned to the printed matter image 80.

Further, in the smart device 12B, in a case where the first display processing is performed, the history information 110 in which the used editing content data 94 and matrix type two-dimensional code 98 are associated with each other is stored in the NVM 50. In a case where the detection unit 48K detects the matrix type two-dimensional code 98 in a state where the history information 110 is stored in the NVM 50, the editing content data 94 associated with the detected matrix type two-dimensional code 98 is acquired from the history information 110. The storing of the history information 110 in the NVM 50 and the acquisition of the editing content data 94 from the history information 110 are realized offline. The printed matter image 106 including the matrix type two-dimensional code 98 detected by the detection unit 48K and the editing content 86 indicated by the editing content data 94 acquired from the history information 110 are displayed on the screen 34. Accordingly, it is possible to cause the user U2 to quickly grasp the aspect in which the editing content 86 is applied to the printed matter image 106, as compared with a case where the storing and acquisition of the editing content data 94 are performed via online.

Further, in the smart device 12B, the image quality of the live view image 36 adjusted by the smart device 12A in response to the editing instruction 81 from the user U1 is applied to the background image of the printed matter image 106 in the live view image 104. Accordingly, the user U1 can adjust the visual impression of the user U2 on the printed matter image 106 displayed on the screen 34 of the smart device 12B.

Further, in the smart device 12B, under a situation common to a situation in which the background image of the printed matter image 80 is displayed on the screen 34 of the smart device 12A in the live view mode during the editing by the user U1 in that the background image of the printed matter image 106 is displayed on the screen 34 in the live view mode, the printed matter image 106 is displayed on the screen 34. Accordingly, it is possible to provide the user U2 who is viewing the printed matter image 106 displayed on the screen 34 with an impression similar to the impression visually received by the user U1 from the printed matter image 80.

Further, in the smart device 12B, the adjusted image quality of the live view image 36 displayed on the screen 34 of the smart device 12A as the background image of the printed matter image 80 is applied to the background image of the printed matter image 106 in the live view image 104. Accordingly, it is possible to adjust the image quality of the background image of the printed matter image 106 in the live view image 104 to image quality intended by the user U1 who has performed the editing work.

Further, in the smart device 12B, the filter 88 used during the editing by the smart device 12A is applied to the background image of the printed matter image 106 in the live view image 104. Accordingly, it is possible to easily adjust the image quality of the background image of the printed matter image 106 in the live view image 104 to the image quality intended by the user U1 who has performed the editing work.

Further, in the smart device 12B, the image for recording 114 obtained by applying the editing content 86 to the printed matter image 106 is stored in the NVM 50. Accordingly, the image for recording 114 can be used in various pieces of processing at a timing desired by the user, which enhances convenience for the user.

Further, in the smart device 12B, in a case where the viewing program 60 is not introduced in the computer 40, the viewing program 60 is introduced into the computer 40 by the introduction execution unit 48N. Accordingly, the viewing processing is not performed since the viewing program 60 is not introduced in the computer 40, and it is possible to prevent occurrence of a situation that the user U2 cannot view the live view image 104 to which the editing content 86 is applied.

In the above-described embodiment, in the example shown in FIG. 7, a form example has been described in which the live view image 36 is applied as a component of the composite image 83, but the technique of the present disclosure is not limited thereto. The video for recording (for example, video for reproduction) may be applied instead of the live view image 36.

In the above-described embodiment, the editing result (that is, final result) obtained by the editing by the editing unit 48B is illustrated as the editing content 86, but the present invention is not limited thereto. The editing content 86 may include a state and/or process in which the editing is being performed.

In the above-described embodiment, in a case where the viewing program 60 has not been introduced into the computer 40, a form example has been described in which the viewing program 60 is introduced into the computer 40. However, this is merely an example. For example, in a case where the viewing program 60 has not been introduced into the computer 40, auxiliary processing of assisting the introduction of the viewing program 60 into the computer 40 may be performed. An example of the auxiliary processing includes processing of presenting, to the user via the UI system device 44, information prompting the user to introduce the viewing program 60 (for example, installing the viewing program 60 in the computer 40).

In the above-described embodiment, the virtual video 86D has been illustrated, but the technique of the present disclosure is not limited thereto. For example, a virtual still image which is a virtually expressed still image may be used instead of the virtual video 86D, or a virtual still image may be used together with the virtual video 86D.

The virtual video 86D may be, for example, a virtual video showing an aspect in which it is raining, a virtual video showing an aspect in which it is snowing, or the like, or a virtual video of any aspect may be employed as long as the virtual video is an unreal two-dimensional video or an unreal three-dimensional video. The same can be said for the virtual still image.

In the above-described embodiment, the description has been made on the premise that the position of the printed matter image 106 displayed on the screen 34 of the smart device 12B is constant on the screen 34, but the technique of the present disclosure is not limited thereto. For example, as shown in FIG. 23, the second display controller 48M may display the editing content 86 in the screen 34 to follow the printed matter image 106. In this case, for example, the second display controller 48M causes a display position and/or display size of the editing content 86 in the screen 34 to follow a change in a display position and/or display size of the printed matter image 106 in the live view image 104 displayed on the screen 34. Accordingly, it is possible to cause the user U2 to continue to visually recognize the editing content 86 even in a case where the display position or display size of the printed matter image 106 in the screen 34 changes.

Further, the second display controller 48M may cause an application position and application size of the filter 88 to follow the display position and/or display size of the printed matter image 106 in the live view image 104 displayed on the screen 34. Accordingly, it is possible to adjust the image quality of the background image of the printed matter image 106 with high accuracy even in a case where the display position or display size of the printed matter image 106 in the live view image 104 displayed on the screen 34 changes.

Figure 24:
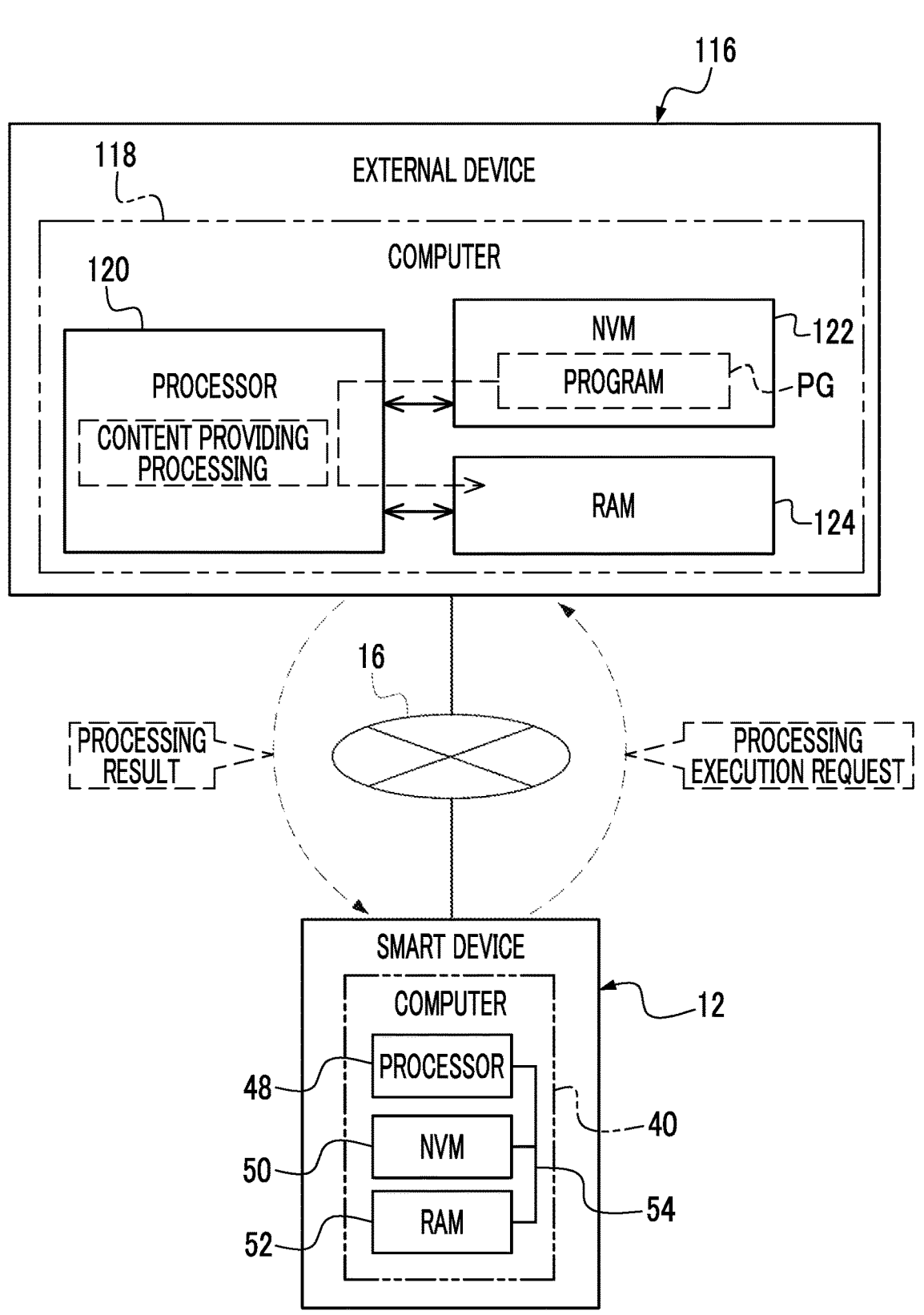
FIG. 24 is a conceptual diagram showing a form example in which content providing processing is performed by an external device in response to a request of the smart device and a processing result is received by the smart device.

In the above-described embodiment, a form example has been described in which the content providing processing is executed by the computer 40 in the smart device 12, but the technique of the present disclosure is not limited thereto. For example, as shown in FIG. 24, the content providing processing may be executed by a computer 118 in an external device 116 communicably connected to the smart device 12 via the network 16. An example of the computer 118 includes a server computer for a cloud service. The computer 118 is an example of an "editing device", an "image processing device", and a "computer" according to the technique of the present disclosure.

In the example shown in FIG. 24, the computer 118 comprises a processor 120, an NVM 122, and a RAM 124. The program PG is stored in the NVM 122.

The smart device 12 requests the external device 116 to execute the content providing processing via the network 16. In response to this, the processor 120 of the external device 116 reads out the program PG from the NVM 122 and executes the program PG on the RAM 124. The processor 120 performs the content providing processing according to the program PG executed on the RAM 124. The processor 120 provides a processing result obtained by executing the content providing processing to the smart device 12 via the network 16.

FIG. 24 shows a form example in which the external device 116 is caused to execute the content providing processing, but this is merely an example. For example, the smart device 12 and the external device 116 may execute the content providing processing in a distributed manner, or a plurality of devices including the smart device 12 and the external device 116 may execute the content providing processing in a distributed manner.

In the above embodiment, a form example has been described in which the program PG is stored in the NVM 50, but the technique of the present disclosure is not limited thereto. For example, the program PG may be stored in a portable non-temporary storage medium such as a solid state drive (SSD) or a USB memory. The program PG stored in the non-temporary storage medium is installed in the computer 40 of the smart device 12. The processor 48 executes the content providing processing according to the program PG.

Further, the program PG may be stored in a storage device, such as another computer or the server 14, connected to the computer 40 via the network 16, and the program PG may be downloaded in response to a request of the computer 40 and installed in the computer 40.

There is no need to store all of the program PG in the storage device, such as another computer or a server, connected to the computer 40, or the NVM 50, and a part of the program PG may be stored.

The following various processors can be used as hardware resources for executing the content providing processing. An example of the processor includes a CPU which is a general-purpose processor executing software, that is, a program to function as the hardware resource for executing the content providing processing. Further, an example of the processor includes a dedicated electric circuit that is a processor having a circuit configuration dedicatedly designed to execute specific processing, such as an application specific integrated circuit (ASIC), a field programmable gate array (FPGA), or a programmable logic device (PLD). A memory is built in or connected to each processor, and each processor uses the memory to execute the content providing processing.

The hardware resource that executes the content providing processing may be configured of one of various processors or may be configured of a combination of two or more processors of the same type or different types (for example, combination of a plurality of FPGAs or a combination of a CPU and an FPGA). Further, the hardware resource that executes the content providing processing may be one processor.

As a configuring example of one processor, first, there is a form in which one processor is configured of a combination of one or more CPUs and software and the processor functions as the hardware resource that executes the content providing processing. Secondly, as represented by an SoC, there is a form of using a processor that realizes functions of the entire system including the plurality of hardware resources that executes the content providing processing with one IC chip. As described above, the content providing processing is realized by using one or more of various processors as the hardware resource.

Further, as a hardware structure of the various processors, more specifically, an electric circuit obtained by combining circuit elements such as semiconductor elements can be used. Further, the above-mentioned content providing processing is merely an example. Therefore, it is needless to say that removal of an unnecessary step, addition of a new step, and change of processing procedure may be employed within a range not departing from the gist.

The contents described and the contents shown hereinabove are specific descriptions regarding the part according to the technique of the present disclosure and are merely an example of the technique of the present disclosure. For example, the descriptions regarding the configurations, the functions, the actions, and the effects are descriptions regarding an example of the configurations, the functions, the actions, and the effects of the part according to the technique of the present disclosure. Accordingly, in the contents described and the contents shown hereinabove, it is needless to say that removal of an unnecessary part, or addition or replacement of a new element may be employed within a range not departing from the gist of the technique of the present disclosure. In order to avoid complication and easily understand the part according to the technique of the present disclosure, in the contents described and the contents shown hereinabove, the description regarding common general technical knowledge or the like which is not necessarily particularly described for enabling implementation of the technique of the present disclosure is omitted.

In the specification, "A and/or B" is identical to "at least one of A or B". That is, "A and/or B" may be only A, only B, or a combination of A and B. In the specification, the same description regarding "A and/or B" is applied also in a case of expressing three or more items with the expression of "and/or".

In a case where all of documents, patent applications, and technical standard described in the specification are incorporated in the specification as references, to the same degree as a case where the incorporation of each of documents, patent applications, and technical standard as references is specifically and individually noted.

What is claimed is:

1. An image processing device comprising:
a first processor,
wherein the first processor is configured to:
 display a first image on a first screen and a first video, as a background image of the first image, on the first screen;
 edit an inside of the first screen in response to a provided instruction in a state where the first image and the first video are displayed on the first screen;
 save an editing content obtained by editing the inside of the first screen;
 acquire a second image that enables a save destination of the editing content to be specified;
 assign the acquired second image to the first image to generate a third image; and
 output the generated third image from an editing device; and
a second processor,
wherein the second processor is configured to:
 capture a printed matter obtained by printing the third image output from the editing device to acquire a fourth image showing the printed matter;
 detect the second image from the fourth image;

acquire the editing content from the save destination based on the second image;
 perform first display processing of displaying the fourth image and the editing content on a second screen;
 store history information in which the second image is associated with the editing content in a memory;
 acquire, in a case where the second image is detected from the fourth image in a state where the history information is stored in the memory, the editing content corresponding to the detected second image from the history information; and
 perform second display processing of displaying, on the second screen, the fourth image including the second image corresponding to the editing content acquired from the history information and the editing content acquired from the history information.

2. The image processing device according to claim 1, wherein the storing of the history information and the acquisition of the editing content from the history information are realized offline.

3. The image processing device according to claim 1, wherein the editing device adjusts, in a state where the first video is displayed on the first screen as the background image of the first image, image quality of the first video to edit the inside of the first screen, and
the second display processing includes
first processing of displaying a second video including the fourth image on the second screen, and
second processing of applying the image quality adjusted by the editing device to a background image of the fourth image in the second video.

4. The image processing device according to claim 3, wherein the second video is a live view image.

5. The image processing device according to claim 3, wherein the adjustment of the image quality is realized by using a first filter, and
the second processing is realized by applying a second filter corresponding to the first filter to the background image of the fourth image in the second video.

6. The image processing device according to claim 5, wherein the second processor is configured to:
cause an application position and application size of the second filter to follow a display position and/or display size of the background image of the fourth image in the second video.

7. The image processing device according to claim 1, wherein the second processor is configured to:
display the fourth image on the second screen in a live view mode; and
display, in the second screen, the editing content to follow the fourth image.

8. The image processing device according to claim 7, wherein the second processor is configured to:
cause a display position and/or display size of the editing content in the second screen to follow a change in a display position and/or display size of the fourth image in the second screen.

9. The image processing device according to claim 1, wherein the second processor is configured to:
acquire an image obtained by reflecting the editing content on the fourth image as a still image for recording or a video for recording.

10. The image processing device according to claim 1, wherein the first display processing and/or the second display processing are realized by executing an application, and the second processor is configured to:

perform, in a case where the application is not introduced, introduction processing of introducing the application or auxiliary processing of assisting the introduction of the application.

11. An image processing device comprising:

a first processor, wherein the first processor is configured to:

display a first image on a first screen and a first video, as a background image of the first image, on the first screen;

edit an inside of the first screen in response to a provided instruction in a state where the first image and the first video are displayed on the first screen;

save an editing content obtained by editing the inside of the first screen;

acquire a second image that enables a save destination of the editing content to be specified;

assign the acquired second image to the first image to generate a third image; and output the generated third image from an editing device; and a second processor, wherein the second processor is configured to:

capture a printed matter obtained by printing the third image output from the editing device to acquire a fourth image showing the printed matter;

detect the second image from the fourth image;

acquire the editing content from the save destination based on the second image; and perform third display processing of displaying the fourth image and the editing content on a second screen, the editing device adjusts image quality of the first video in a state where the first video is displayed on the first screen as the background image of the first image to edit the inside of the first screen, and the third display processing includes third processing of displaying a second video including the fourth image on the second screen, and fourth processing of applying the image quality adjusted by the editing device to a background image of the fourth image in the second video.

12. The image processing device according to claim 11, wherein the second video is a live view image.

13. The image processing device according to claim 12, wherein the adjustment of the image quality is realized by using a first filter, and the fourth processing is realized by applying a second filter corresponding to the first filter to the background image of the fourth image in the second video.

14. The image processing device according to claim 13, wherein the second processor is configured to:

cause an application position and application size of the second filter to follow a display position and/or display size of the background image of the fourth image in the second video.

15. The image processing device according to claim 11, wherein the second processor is configured to:

cause, in the second screen, the editing content to follow the fourth image.

16. The image processing device according to claim 15, wherein the second processor is configured to:

cause a display position and/or display size of the editing content in the second screen to follow a change in a display position and/or display size of the fourth image in the second screen.

17. The image processing device according to claim 11, wherein the second processor is configured to:

acquire an image obtained by reflecting the editing content on the fourth image as a still image for recording or a video for recording.

18. The image processing device according to claim 11, wherein the third display processing is realized by executing an application, and the second processor is configured to:

perform, in a case where the application is not introduced, introduction processing of introducing the application or auxiliary processing of assisting the introduction of the application.

19. A terminal device comprising:

the image processing device according to claim 10; and a second communication interface that controls communication between the image processing device and an external device.

20. An image processing method comprising:

displaying a first image on a first screen and a first video, as a background image of the first image, on the first screen;

editing an inside of the first screen in response to a provided instruction in a state where the first image and the first video are displayed on the first screen;

saving an editing content obtained by editing the inside of the first screen;

acquiring a second image that enables a save destination of the editing content to be specified;

assigning the acquired second image to the first image to generate a third image;

outputting the generated third image from an editing device;

capturing a printed matter obtained by printing the third image output from the editing device to acquire a fourth image showing the printed matter;

detecting the second image from the fourth image;

acquiring the editing content from the save destination based on the second image;

performing first display processing of displaying the fourth image and the editing content on a second screen;

holding history information in which the second image is associated with the editing content;

acquiring, in a case where the second image is detected from the fourth image in a state where the history information is held, the editing content corresponding to the detected second image from the history information; and performing second display processing of displaying, on the second screen, the fourth image including the second image corresponding to the editing content acquired from the history information and the editing content acquired from the history information.

21. An image processing method comprising:

displaying a first image on a first screen and a first video, as a background image of the first image, on the first screen;

editing an inside of the first screen in response to a provided instruction in a state where the first image and the first video are displayed on the first screen;

saving an editing content obtained by editing the inside of the first screen;

acquiring a second image that enables a save destination of the editing content to be specified;

assigning the acquired second image to the first image to generate a third image;

outputting the generated third image from an editing device;

capturing a printed matter obtained by printing the third image output from the editing device to acquire a fourth image showing the printed matter;

detecting the second image from the fourth image;

acquiring the editing content from the save destination based on the second image; and performing third display processing of displaying the fourth image and the editing content on a second screen, wherein the editing device adjusts, in a state where the first video is displayed on the first screen as the background image of the first image, image quality of the first video to edit the inside of the first screen, and the third display processing includes third processing of displaying a second video including the fourth image on the second screen, and fourth processing of applying the image quality adjusted by the editing device to a background image of the fourth image in the second video.

22. A non-transitory computer-readable storage medium storing a program executable by a computer to perform:

displaying a first image on a first screen and a first video, as a background image of the first image, on the first screen;

editing an inside of the first screen in response to a provided instruction in a state where the first image and the first video are displayed on the first screen;

saving an editing content obtained by editing the inside of the first screen;

acquiring a second image that enables a save destination of the editing content to be specified;

assigning the acquired second image to the first image to generate a third image;

outputting the generated third image from an editing device;

image processing including capturing a printed matter obtained by printing the third image output from the editing device to acquire a fourth image showing the printed matter;

detecting the second image from the fourth image;

acquiring the editing content from the save destination based on the second image;

performing first display processing of displaying the fourth image and the editing content on a second screen;

holding history information in which the second image is associated with the editing content;

acquiring, in a case where the second image is detected from the fourth image in a state where the history information is held, the editing content corresponding to the detected second image from the history information; and performing second display processing of displaying, on the second screen, the fourth image including the second image corresponding to the editing content acquired from the history information and the editing content acquired from the history information.

23. A non-transitory computer-readable storage medium storing a program executable by a computer to perform:

image processing, wherein the image processing includes displaying a first image on a first screen and a first video, as a background image of the first image, on the first screen, editing an inside of the first screen in response to a provided instruction in a state where the first image and the first video are displayed on the first screen, saving an editing content obtained by editing the inside of the first screen, acquiring a second image that enables a save destination of the editing content to be specified, assigning the acquired second image to the first image to generate a third image, outputting the generated third image from an editing device, capturing a printed matter obtained by printing the third image output from the editing device to acquire a fourth image showing the printed matter, detecting the second image from the fourth image, acquiring the editing content from the save destination based on the second image, and performing third display processing of displaying the fourth image and the editing content on a second screen, the editing device adjusts, in a state where the first video is displayed on the first screen as the background image of the first image, image quality of the first video to edit the inside of the first screen, and the third display processing includes third processing of displaying a second video including the fourth image on the second screen, and fourth processing of applying the image quality adjusted by the editing device to a background image of the fourth image in the second video.

\* \* \* \* \*